(12) United States Patent
Ochi et al.

(10) Patent No.: US 6,571,844 B1
(45) Date of Patent: Jun. 3, 2003

(54) PNEUMATIC TIRE HAVING TREAD INCLUDING PAIRS OF SIPES

(75) Inventors: Naoya Ochi, Tokyo (JP); Masaharu Kimura, Tokyo (JP); Makoto Kurokawa, Tokyo (JP); Hiroshi Kawabe, Tokyo (JP); Hiroto Yoshida, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 79 days.

(21) Appl. No.: 09/619,499

(22) Filed: Jul. 19, 2000

(30) Foreign Application Priority Data

| Jul. 19, 1999 | (JP) | 11-204580 |
| Aug. 31, 1999 | (JP) | 11-245796 |
| Nov. 22, 1999 | (JP) | 11-331677 |
| Nov. 22, 1999 | (JP) | 11-331678 |
| Nov. 22, 1999 | (JP) | 11-331679 |
| Dec. 28, 1999 | (JP) | 11-374816 |

(51) Int. Cl.[7] ............................. B60C 11/11; B60C 11/12
(52) U.S. Cl. ........................ 152/209.18; 152/209.22; 152/209.23; 152/209.27; 152/902; 152/DIG. 3
(58) Field of Search ..................... 152/209.7, 209.18, 152/209.22, 209.23, 209.24, 209.26, 209.27, 902, DIG. 3

(56) References Cited

U.S. PATENT DOCUMENTS

| 4,796,683 A | | 1/1989 | Kawabata et al. |
| 5,127,455 A | * | 7/1992 | Remick |
| 5,714,026 A | | 2/1998 | Wakabayashi |
| 5,873,399 A | * | 2/1999 | Ochi et al. |
| 6,170,546 B1 | * | 1/2001 | Koyama et al. |
| 6,250,354 B1 | * | 6/2001 | Kawai |

FOREIGN PATENT DOCUMENTS

| EP | 0438319 A1 | | 7/1991 |
| EP | 0 457 233 A3 | | 11/1991 |
| EP | 810104 | * | 12/1997 |
| EP | 0 882 606 A2 | | 12/1998 |
| FR | 2 703 002 A1 | | 9/1994 |
| GB | 2 021 494 A | | 12/1979 |
| JP | 1-101204 | * | 4/1989 |
| JP | 2-200503 | * | 8/1990 |
| JP | 3-10913 | * | 1/1991 |
| JP | 3-38406 | * | 2/1991 |
| JP | 8-53004 | * | 2/1996 |
| JP | 9-142110 | * | 6/1997 |
| JP | 9-164816 | | 6/1997 |
| JP | 9-193616 A | | 7/1997 |
| JP | 2000-264019 A | | 9/2000 |
| JP | 2000-280713 A | | 10/2000 |

OTHER PUBLICATIONS

*Patent Abstracts of Japan*, vol. 2000, No. 12 (Jan. 3, 2001).
*Patent Abstracts of Japan*, vol. 2000, No. 13 (Feb. 5, 2001).

* cited by examiner

Primary Examiner—Steven D. Maki
(74) Attorney, Agent, or Firm—Sughrue Mion, PLLC

(57) ABSTRACT

Sipes extending from one end of a block to the central area of the block and sipes extending from the other end of the block to the central area of the block (sipes 24, 28, 32 and 36) are inclined in directions opposite to each other. The sipes extending from one end of the block and the sipes extending from the other end of the block intersect a common line extending along the circumferential direction of the tire. Due to this structure, the number of portions of the sipes, which portions are located in the central area of the block, is made greater than that in the peripheral area of the block. The density of sipes is thus increased in the central area of a block where water tends to form when driving on ice, for improving braking and traction properties on ice.

20 Claims, 29 Drawing Sheets

CIRCUMFERENTIAL DIRECTION OF THE TIRE

CIRCUMFERENTIAL DIRECTION OF THE TIRE

CIRCUMFERENTIAL DIRECTION OF THE TIRE $\beta > \gamma$

CL

PNEUMATIC TIRE HAVING TREAD INCLUDING PAIRS OF SIPES

BACKGROUND OF THE INVENTION

1. Field of the Invention

The present invention relates to a pneumatic tire and more particularly to a pneumatic tire having a tread with a block pattern.

2. Description of the Related Art

Sipes formed in ribs and blocks of a tread exhibit the effect of cutting through water films on road surfaces, similar to edges of grooves. The sipes also facilitate deformation of ribs and blocks and help exhibition of rubber hysteresis loss. Therefore, sipes are widely used in studless tires.

As shown in FIG. 3, studless tires generally have zigzag or straight sipes 100, extending substantially parallel to tire circumferential-direction end portions of blocks (i.e., the end portions of blocks which are continuous with the block end portions running along the circumferential direction of the tire). Alternatively, as shown in FIG. 26, studless tires generally have sipes 102 which are approximately perpendicular to the circumferential direction of the tire in each block 101.

However, when the sipes incline in the same direction on each block as described above, and when tires are used on snowy or icy roads, the effects of the sipe is satisfactory only for driving direction. Moreover, the degree of deformation of the blocks during driving is markedly different depending on the direction of the applied force. This means that the conventional method of forming sipes is not effective for improving cornering property, although the method is effective for improving braking and traction properties on ice. Moreover, when the tires are used on dry or wet roads, the rigidity of the blocks with respect to forward or backward force is small. Therefore, controllability at small steering angles is often insufficient. Even if the angle of sipes with respect to tire circumferential direction is changed, it is difficult to obtain suitable properties for both of braking and traction because rigidity of the block with respect to the forward force is different from that with respect to the backward force.

To improve tire braking on icy roads, it is desirable to increase sipe density at the central portion of the blocks. However, when the density of the sipes in an entire block is increased, block rigidity decreases and there is the possibility that controllability for dry and wet roads, and abrasion resistance of the tire are adversely affected.

When the density of sipes on entire blocks is excessively increased, the area of the tread contacting road surfaces decreases due to blocks collapsing and the properties when driving on icy roads also deteriorate. Moreover, in the above case, defects such as bareness and chipping tend to be more frequent during tire production.

For simultaneous good block rigidity and sipe effect (edge effect and water removal), it is desirable that the density of sipes be increased in the central portion of a block and decreased in block peripheral portions (for example, Japanese Patent Application Laid-Open No. 9(1997)-164816). However, from the standpoint of production, it is difficult to satisfactorily produce such a tire using conventional technology.

SUMMARY OF THE INVENTION

An object of the present invention is to overcome the above problems of conventional methods of forming sipes and provide a pneumatic tire having improved properties for icy and snowy roads, and in particular, good properties when used on icy roads.

Another object of the present invention is to provide a pneumatic tire having a block pattern with suitable sipe effect in multiple directions, good block rigidity with respect to force in any direction, and high density of sipes in the central area of each block.

Still another object of the present invention is to provide a pneumatic tire having a block pattern with suitable sipe effect in multiple directions, good block rigidity with respect to force in any direction, high density of sipes, and good tire properties for both braking and traction.

Still another object of the present invention is to provide a pneumatic tire having a block pattern with satisfactory sipe effect in multiple directions, good block rigidity with respect to force in any direction, and good controllability and resistance to uneven wear.

Still another object of the present invention is to provide a pneumatic tire having a block pattern which provides improved properties when driving on icy and snowy roads without adverse effects to properties when driving on dry roads and wet roads.

As the first aspect, the present invention provides a pneumatic tire comprising a tread having blocks defined by a plurality of intersecting grooves, wherein each of the blocks have at least one pair of sipes which are formed from first and second sipes, the first sipe extends from one of two tire axial direction end portions of the block and is inclined with respect to a circumferential direction of the tire. The second sipe extends from the other tire axial direction end portion of the block and is inclined with respect to the circumferential direction of the tire. The first and second sipes are alternately disposed along the circumferential direction of the tire. An end portion of the first sipe in the vicinity of a center of the block, and an end portion of the second sipe in a vicinity of a center of the block, intersect an imaginary common line extending along the circumferential direction of the tire. Further, the first and second sipes are inclined in opposite directions.

In the block, the sipe edge effect can be obtained for force applied from any direction since the first and second sipes are disposed alternately and the first and second sipes are inclined in opposite directions. For example, when a force from a direction parallel to the first sipe is applied to the tire, the second sipe provides the edge effect, although there is substantially no sipe edge effect from the first sipe in this case. That the first and second sipes incline in opposite directions means that, in the portion of the tire contacting the road surface when the tire is used on a vehicle, the first sipe is inclined in a manner such that the end portion of the first sipe, which end portion is at the side of the center of the block is placed in the front or in the rear of the other end portion, the second sipe is inclined in a manner such that the end portion of the second sipe, which end portion is at the side of the center of the block is placed in the front or in the rear of the other end portion. The angle between the first sipe and the circumferential direction of the tire is not always the same as the angle between the second sipe and the circumferential direction of the tire. Therefore, the cornering property when driving on icy road, on which the sipe edge effect is particularly effective, can be improved.

Since the end portion of the first sipe which is at the side of the center of each block and end portion of the second sipe which is at the side of the center of each block intersect an imaginary common line extending along the circumferential direction of the tire, the number of sipes in the central area of the block is greater relative to that in the peripheral areas of the block (end portions of the block).

Since the density of sipes increases in the central area of the block in which, when driving on icy roads, water film forms more easily than in the peripheral areas of the block, the number of edge components is effectively increased, and water film absorption properties are enhanced, and braking and traction properties improve. Here, edge components designate portions of both sides of a groove and portions of both sides of a sipe which are substantially straight and which form an edge when the sipe is open.

Moreover, density of sipes in the peripheral areas of the block (end portions of the block) can be lower than density of sipes, formed by conventional methods, in the peripheral areas for providing sufficient block rigidity. More specifically, since rigidity at the central area of the block can be decreased while maintaining sufficient block rigidity in peripheral portions, a sufficient area of the portion contacting the road surfaces can be obtained by suppressing falling down (collapsing) of the entire block during driving, and the controllability when driving on dry and on wet roads can be improved compared to that of conventional tires.

In the above tire, it is preferable that each block has pairs of sipes formed of first and second sipes. The first sipes on each block are parallel with one another, as are the second sipes on each block.

Accordingly, block rigidity can be properly maintained, and uneven wear can be reduced.

Further, in the above tire, it is preferable that the blocks are defined by grooves extending along a circumferential direction of the tire and grooves which intersect the circumferential grooves. The first sipes of each block disposed linearly along the circumferential direction of the tire are all inclined in the same direction. Further, the sipes are disposed at a predetermined interval. The second sipes of each block disposed linearly along the circumferential direction of the tire are all inclined in the same direction and also disposed at a predetermined interval.

By disposing the first or second sipes at a constant interval in each block, change in rigidity of the central area and the peripheral areas of the block depending on the direction of the applied force can be suppressed, along with uneven wear.

Moreover, by forming sipes in a manner such that first sipes or the second sipes formed in blocks which are disposed in a straight line along the circumferential direction of the tire are disposed in the same direction and such that a distance between the first sipes or the second sipes formed in each block is constant, and by repeating in the circumferential direction of the tire a specified block pattern, which has sipes, along the axial direction of the tire, the tire abrades more uniformity.

In the above tire, it is preferable that the grooves extending along the circumferential direction of the tire comprise first grooves and second grooves which are narrower than the first grooves, and the second grooves are disposed between the first grooves and have a width of 0.5 to 6 mm.

Even when the blocks divided by the first grooves are large, a decrease in the ability of the central area of the block to remove water can be prevented since the second groove is disposed dividing each of the blocks into two portions. By disposing the second grooves, the number of edge components extending in the circumferential direction increase and cornering properties on ice and on snow improve. When the width of the second groove is smaller than 0.5 mm, there is increased risk that the ability of the blocks divided by the first grooves and the second grooves for removing water will deteriorate. When the width of the second groove exceeds 6 mm, the divided blocks become small and rigidity of the block decreases, although the ability of the blocks to remove water improves.

It is preferable that the first sipes and the second sipes do not intersect each other. When the first sipe and the second sipe intersect each other and the first sipes intersect each other and the second sipes intersect each other, rigidity substantially decreases at the portion of the intersection and uneven wear may take place. When no sipes intersect each other, this problem can be substantially avoided.

It is preferable that the first and second sipes in the blocks disposed in the central area of the tread are disposed at an angle of 45 to 85° and more preferably 55 to 80° relative to the circumferential direction of the tire. When the angle between the first (or second) sipe in the block disposed in the central area of the tread and the circumferential direction of the tire is smaller than 45°, the number of edge components effectively working in the circumferential direction of the tire is insufficient and traction and braking properties deteriorate. When the angle between the first (or second) sipe in the block disposed in the central area of the tread and the circumferential direction of the tire exceeds 85°, the angle between one of the first sipe and the second sipe and an extended line of the other nears 180° and the advantageous effect of improving the cornering properties decreases.

It is preferable that an angle between one of first and second sipes and an extended line of the other is 10 to 45°. Thereby properties on snow (in particular cornering properties), controllability on dry and wet road surfaces under application of force in a small steering angle and braking properties on ice, in particular, on smooth and slippery road surfaces are improved.

In the above pneumatic tire, it is preferable that the distance between the first sipes and that between the second sipes are 2 to 5 mm. These distances are the optimum between the sipes to obtain the effect of the sipes described above.

A central area C and two end areas E are obtained by imaginarily dividing each block into three equal parts. $\omega_c$ represents a total length, in the circumferential direction of the tire, of respective portions of one first sipe and one second sipe which portions are located within the central area C. $\delta_c$ represents a total length, in the axial direction of the tire, of those. $\omega_e$ represents the longer of a length, in the circumferential direction of the tire, of a portion of one first sipe, which portion is located in an end area E, and a length, in the circumferential direction of the tire, of a portion of one second sipe, which portion is located in an end area E. $\delta_e$ represents the longer of a length, in the axial direction of the tire, of the portion of one first sipe, which portion is located in the end area E, and a length, in the axial direction of the tire, of the portion of one second sipe, which portion is located in the end area E. It is preferable that ace $\omega_c$, $\omega_e$, $\delta_c$, and $\delta_e$ satisfy the relations: $\omega_c > \omega_e$ and $\delta_c > \delta_e$. When the above relations are satisfied, a greater density of sipes can be achieved in the central area of the block and the above described effects can be obtained.

In the above pneumatic tire, it is preferable that the depths of end portions of the first or second sipe are shallower than that of a central portion thereof Thus, the rigity of the end portions of the block is higher. Further, although the density of sipes is greater at the central portion of the block than at the end portions thereof, the rigidity at the central portion of the block is sufficient.

It is preferable that blocks disposed in side areas of the tread have sipes whose angle with respect to a circumferential direction of the tire is equal to or greater than an angle between each of the sipes formed in blocks disposed in the central area of the tread and the circumferential direction of the tire.

By forming sipes in a manner such that the angle between each of the sipes formed in the blocks disposed in the side areas of the tread, i.e., in both shoulder portions, and the circumferential direction of the tire is equal to or greater than the angle between each of the sipes formed in the blocks disposed in the central area of the tread and the circumferential direction of the tire, i.e., by disposing the sipes in side areas of the tread in the direction closer to the axial direction of the tire, uneven wear which tends to occur in the shoulder portions can be suppressed. It is preferable that the angle between the circumferential direction of the tire and the sipes, which extend from the end portion in the vicinity of the shoulder of the blocks in the area of both sides of the tread, is greater than the angle between the circumferential direction of the tire and the sipes which are formed in blocks in the central area of the tread.

The central area and the side areas of the tread described above are the central area and the side areas, respectively, obtained by dividing the tread into three areas in the axial direction.

It is preferable that a distance between end portion of the first sipe, which end portion is in the vicinity of the center of the block, and end portion of the second sipe, which end portion is in the vicinity of the center of the block, in an axial direction of the tire is 2 to 15 mm and more preferably 3 to 10 mm. When the distance is less than 2 mm, the density of sipes in the central area of the block cannot be increased. Even when the tire has a large size, i.e., even when the tire has large blocks, it is preferable that the distance is 15 mm or smaller. The reason is as follows. When the distance is excessively great, the distance between the sipes in the circumferential direction of the tire must be made greater in order to dispose the first sipes and the second sipes in a manner so that the first sipes and the second sipes incline in opposite directions and, at the same time the first sipes and the second sipes do not intersect each other or do not connect to each other. However, when the distance between the central side end portions of the first sipes and the second sipes in the axial direction of the tire is made greater, the number of the sipes formed in the block decreases and density of sipes in the central area of the block cannot be made great. To prevent the decrease in the number of the sipes, it is necessary that the angle of the sipes with respect to the circumferential direction of the tire be made close to 90°, i.e., the direction of the sipes be made closer to the axial direction of the tire. When the direction of the sipes is made closer to the axial direction of the tire, cornering properties on ice deteriorates. Therefore, it is preferable that the distance between the central side end portions of the first sipes and the second sipes in the axial direction of the tire be 15 mm or less.

An area of the tread having 30 to 70% of an entire width of an area contacting road surfaces at the center of the tread, is referred to as a central area. Remaining areas are referred to as side areas. It is preferable that a chevron formed by one of the first and second sipes and an extended line of the other sipe of the pair in blocks in the central area, and a chevron formed by one of the first and second sipes forming a pair and an extended line of the other sipe of the pair in blocks in the side areas are placed in directions opposite to each other with respect to the circumferential direction of the tire. Improved sipe edge effects can be obtained for both braking and traction. The width of the area contacting road surfaces described above is the width of the area of the tire contacting the road surface when the tire is attached to a rim suitable for the tire size in accordance with standards of various countries such as the standard of Japanese Automobile Tire Manufacturers Association in Japan, the standard of ETRTO (European Tire & Rim Technical Organization) in Europe and the standard of Tire and Rim Association in the United States of America, with an applied load of 88% of the maximum allowable.

It is preferable that the blocks have pairs of sipes which are formed from first and second sipes. When each block is equally divided (imaginarily) in first and second portions by a line extending along the tire axial direction, apices of chevrons each formed by one of the first sipe and the second sipe forming a pair in the first portion and an extended line of the other sipe of the pair face apices of chevrons each formed by one of the first sipe and the second sipe forming a pair in the second portion and an extended line of the other sipe of the pair. Thereby, the sipe effect is present even when force is applied in various or multiple directions, and improved edge effects are present for both braking and traction in each block.

It is preferable that in each block, an angle between the radial direction of the tire and a first wall of the block at a side of an apex of a chevron formed by one of the first and second sipes forming a pair, and an extended line of the other sipe of the pair is greater than an angle between the radial direction of the tire and a second side wall of the block at a side opposite to said first side wall. Thereby, rigidity of each block is sufficient for both braking and traction.

In the above tire, the central portions of first sipes and the second sipes can be zigzag or wavy and end portions can be substantially straight.

By making the central portion of the sipes zigzag or wavy, the total length of the sipe edge increases and water film on icy roads can be absorbed more efficiently. Further, because the number of edge components effective for the circumferential direction of the tire and the number of edge components effective for the axial direction of the tire can be increased, cornering performance in particular is improved.

By making the end portion of the sipe, which end portion is in the vicinity of the end of the block, substantially straight, the angle between the end portion of the sipe and the edge of the block can be kept substantially the same for the respective sipes and uneven wear can be suppressed. By making the end portion of the sipe, which end portion is at the central side of the block, substantially straight, the sipe opens more easily than a sipe which is formed in a zigzag or wavy pattern all the way from one end of the sipe to the other. Snow penetrates into open sipes, i.e., the sipes hold snow, and tire properties on snow are improved.

In the above pneumatic tire, it is preferable that the first and second sipes are one of curved and bent in the direction of the depth of the block and inclined with respect to a radial direction of the tire. Falling down (collapse) of blocks between the sipes is better suppressed by this structure when a force is applied thereto and properties on ice and on snow improve.

In the above pneumatic tire, it is preferable that a number of the first and second sipes formed on each block is two or more, and at least four sipes of the first sipes and the second sipes are one of curved and bent in the direction of the depth of the block and inclined with respect to a radial direction of the tire. Accordingly, when force is applied, portions of both sides of the sipes of the blocks support one another and falling down (collapse) of the blocks is prevented.

In the above pneumatic tire, it is preferable that rubber used in the tread is an expanded rubber. It is preferable that a degree of expansion of the expanded rubber is 10 to 50%. By combining the sipes and the expanded rubber, properties on snow and ice can be improved.

In the second aspect, the present invention provides a pneumatic tire which comprises a tread formed in a toroidal shape, a pair of side walls disposed at inner positions in a radial direction of the tire from end portions of the tread, and beads connected to the side walls at inner positions in a radial direction of the tire, wherein the tread has a block pattern having pairs of blocks, each pair includes a first block and a second block which are arranged in an axial direction of the tire in a chevron-like arrangement with an apex of the chevron-like arrangement directed in the tire circumferential direction, a tire circumferential direction end of the block pair at an apex side of the chevron-like arrangement of the block pair being a first tire circumferential direction end of the block pair, and a tire circumferential direction end of the block pair at a side opposite to the apex side being a second tire circumferential direction end of the block pair;

a side wall of the first block, which side wall is opposite a second block side of said first block, is a first side wall, a tire radial direction lower portion of the first side wall at the first tire circumferential direction end of the block pair being disposed further away from the second block than a tire radial direction upper portion of the first side wall at the first tire circumferential direction end of the block pair, the tire radial direction lower portion of the first side wall being gradually inclined toward the second block along the tire circumferential direction from the first tire circumferential direction end of the block pair toward the second tire circumferential direction end of the block pair, a side wall of the second block, which side wall is opposite a first block side of said second block, is a second side wall, a tire radial direction lower portion of the second side wall at the first tire circumferential direction end of the block pair being disposed further away from the first block than a tire radial direction upper portion of the second side wall at the first tire circumferential direction end of the block pair, the tire radial direction lower portion of the second side wall being gradually inclined toward the first block along the tire circumferential direction from the first tire circumferential direction end of the block pair toward the second tire circumferential direction end of the block pair.

By forming pairs of blocks as described above, properties on ice and on snow can be further improved due to the blocks deforming advantageously when force in the circumferential direction of the tire is applied thereto due to an increase in the projected edge (i.e., W in FIG. 17). Deformation of the blocks to force applied along the axial direction of the tire or forces applied along directions other than that described above can be suppressed. Thus, properties on ice and on snow can be improved without sacrificing the properties on dry or wet road surfaces.

In the above pneumatic tire, it is preferable that the first block and the second block have a plurality of sipes which are disposed substantially parallel with end portions of the blocks to which end portions the apexes of the chevrons point.

In the above pneumatic tire, it is preferable that the angle between the first portion of the first side wall and the radial direction of the tire and the angle between the second portion of the second side wall and the radial direction of the tire are each +5 to +15°. When force is applied from the direction of the apex of the chevron, sufficient rigidity is obtained and falling down (collapse) of the block can be suppressed.

In the above pneumatic tire, it is preferable that an angle formed by the radial direction of the tire and the first side wall at the second tire circumferential direction end of the block pair and an angle formed by the radial direction of the tire and the second side wall at the second tire circumferential direction end of the block pair are −5 to +2°. The side opposite to the side of the apex of the chevron tends to deform when force is applied thereto. Thus, properties on ice and on snow are improved.

In the above pneumatic tire, it is preferable that the distance between blocks of each pair is 0.3 to 1.0 mm. In this condition, blocks of each pair can support each other and deformation by the applied force from the axial direction of the tire decreases.

It is preferable that the rubber used in the tread is an expanded rubber having a degree of expansion of 10 to 50%. By the combination of the expanded rubber and the sipes in accordance with the present aspect, the properties on ice and on snow can be further improved.

DETAILED DESCRIPTION OF THE PREFERRED EMBODIMENTS

A first embodiment of a pneumatic tire 10 in accordance with the present invention will be described with reference to FIGS. 1 and 2.

Figure 1:
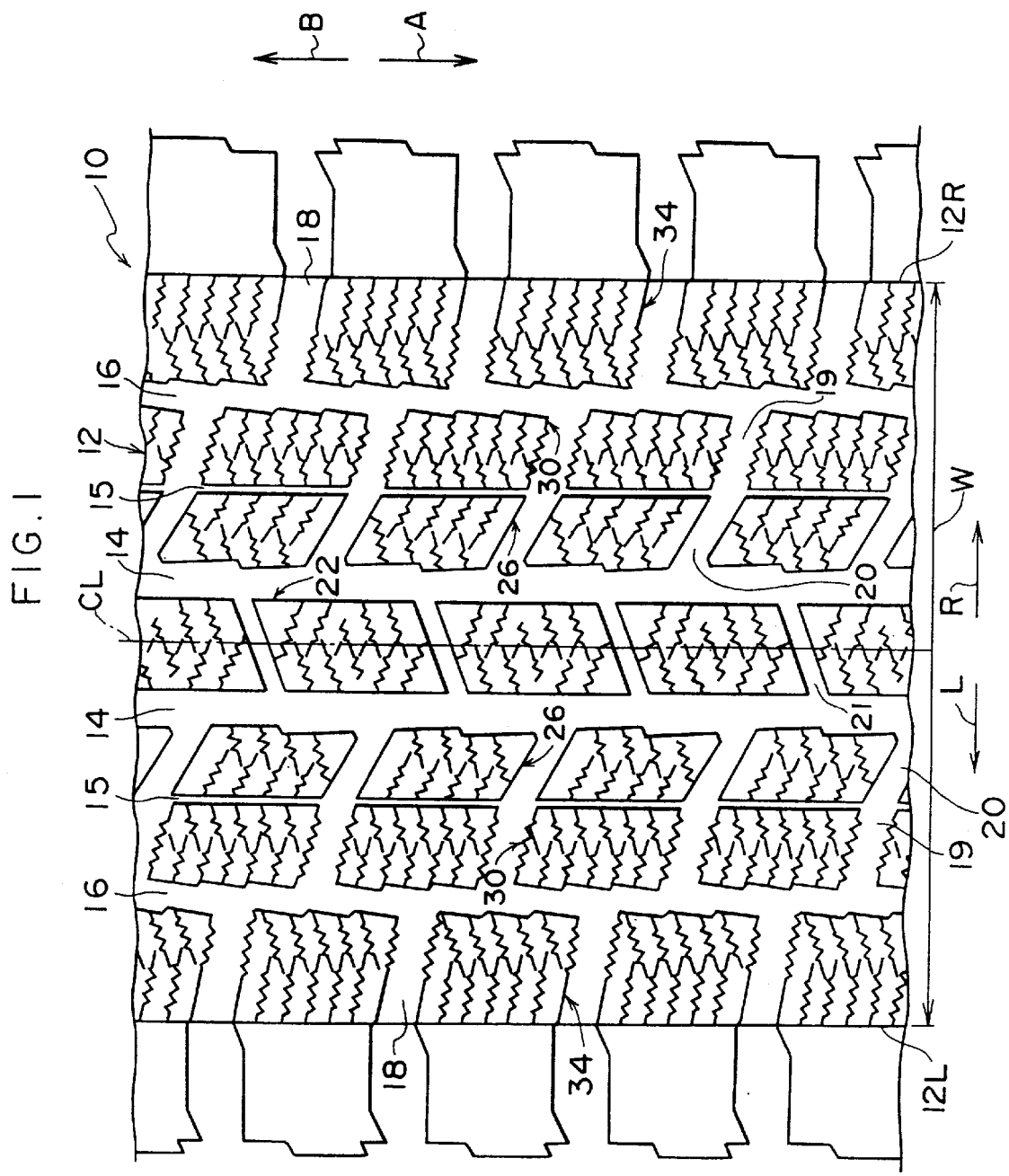
FIG. 1 is a plan view of a tread of a first preferred embodiment of a pneumatic tire in accordance with the present invention.

In FIG. 1, the arrow L and the arrow R show the leftward direction and the rightward direction, respectively, of the tire (both directions may be referred to as the axial direction of the tire). The arrow A and the arrow B shows the direction of rotation of the tire and the direction of tire travel relative over a ground surface, respectively, for the lowest portion of the tire (both directions may be referred to as the circumferential direction of the tire).

As shown in FIG. 1, in the tread 12 (W represents the width of the tread) of the pneumatic tire 10 of the present invention, circumferential broad grooves 14 extend in the circumferential direction of the tire at both sides of the tire equatorial center line ("CL") plane. At the tire axial direction outer side of each circumferential broad groove 14, circumferential narrow grooves 15 extend substantially in the circumferential direction of the tire 10. At the tire axial direction outer sides of each circumferential narrow groove 15, circumferential broad grooves 16 extend substantially in the circumferential direction of the tire 10.

In the tread 12, a plurality of transverse grooves 18 extend from each end portion 12L or 12R of the tread and connect to the circumferential broad groove 16. A plurality of transverse grooves 19 connect the circumferential broad groove 16 and the circumferential narrow groove 15. A plurality of transverse grooves 20 connect the circumferential narrow groove 15 and the circumferential broad groove 14. A plurality of transverse grooves 21 connect the circumferential broad grooves 14 on opposite sides of the equatorial CL plane to one another.

The transverse grooves 18 extending from the end portions 12L and 12R of the tread are all disposed substantially linearly and inclined in the same direction with respect to the equatorial plane of the tire. The angle between the transverse groove 18 and the circumferential direction of the tire is preferably in the range of 40 to 90°.

In the present embodiment, the transverse grooves 18 are disposed in a manner such that the left end portion of each transverse groove 18 is placed at a position offset in the direction of the arrow B relative to that of the right end portion. The angle between each transverse groove 18 and the circumferential direction of the tire is set to 80°.

The shape of the right side, in the vicinity of the circumferential broad groove 16, of the transverse groove 18 is zigzag. The shape of a left side in the vicinity of the shoulder, of the transverse groove 18 is substantially straight.

The transverse grooves 19 are disposed in a manner such that each transverse groove 19 is inclined in the same direction as that of the transverse groove 18. The angle between each transverse groove 19 and the circumferential direction of the tire is set at a smaller value than the angle between the transverse groove 18 and the tire circumferential direction. The end portions of each transverse groove 19 is substantially straight. The edges in between the end portions of each transverse groove 19 have a zigzag shape.

The transverse grooves 20 are disposed in a manner such that each transverse groove 20 is inclined in the same direction as that of the transverse groove 19. The angle between each transverse groove 20 and the circumferential direction of the tire is set at a smaller value than the angle between the transverse groove 19 and the tire circumferential direction. The shape of each transverse groove 20 is substantially straight.

The transverse grooves 21 are inclined in a direction transverse to the inclination directions of the transverse grooves 18, 19 and 20. The shape of the transverse groove 21 is substantially straight.

Figure 2:
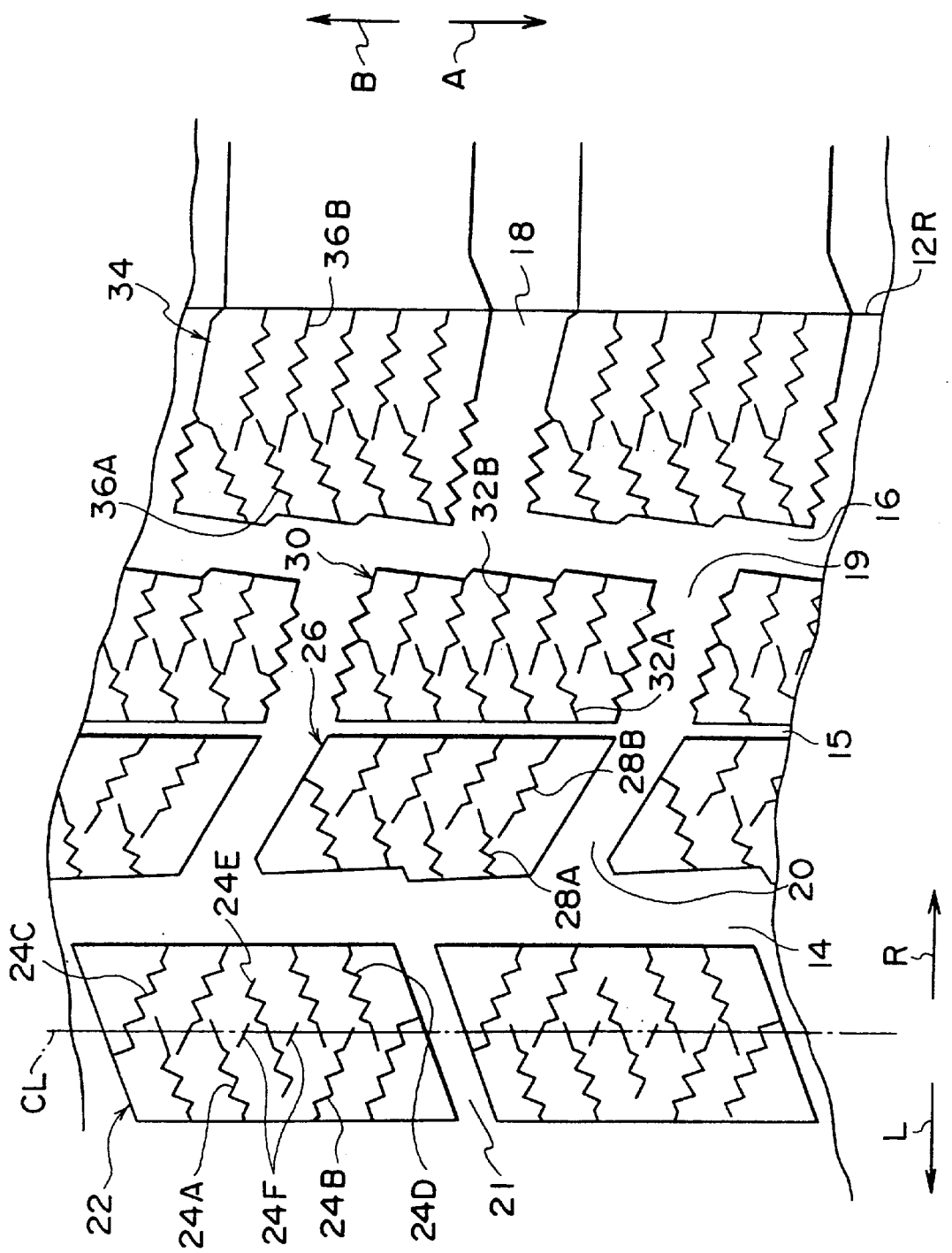
FIG. 2 is an enlarged view of a portion of the tread shown in FIG. 1.

As shown in FIG. 2, each of a plurality of first blocks 22 are arranged along the equatorial plane of the tire. The first block 22 are defined by the circumferential broad grooves 14 and the transverse grooves 21. Each first block 22 has sipes 24A extending from the block left end portion toward the equatorial plane of the tire CL and inclined at a predetermined angle upwardly from left to right. Sipes 24B also extend from the same end portion toward the equatorial plane of the tire CL, but are inclined at a predetermined angle downwardly from left to right. Sipes 24C also extend from the block right end portion toward the equatorial plane of the tire CL, and are inclined at a predetermined angle downwardly from left to right. Sipes 24D extend from the block right end portion toward the equatorial plane of the tire CL and are inclined at a predetermined angle upwardly from left to right. Sipe 24E is inclined at a predetermined angle in the central area of the block 22 upwardly from left to right. Short sipes 24F are placed at opposite tire circumferential direction sides of the sipes 24E and inclined at a predetermined angle downwardly from left to right.

The sipes 24A and the sipes 24C are disposed alternately with one another. The sipes 24B and the sipes 24D are also disposed alternately. The sipe 24E is disposed between the sipes 24A and the sipes 24D.

The sipes 24A and the sipes 24C are disposed in a manner such that these sipes intersect the equatorial plane of the tire CL, but do not intersect nor connect to each other. The sipes 24B and the sipes 24D are disposed in a similar manner. In the present embodiment, the distance between block central side end portions of the sipes 24A and 24C in the axial direction of the tire and that of sipes 24C and 24D in the axial direction of the tire are each nominally 4.5 mm.

The middle portions of the sipes 24A, 24B, 24C and 24D in the present embodiment, are zigzag. The end portions of most of the sipes 24A, 24B, 24C and 24D, which end portions are in the vicinity of the end portions of the block or which end portions are in the vicinity of the central area of the block, are substantially straight.

The sipes 24E, 24A and 24D each intersect the equatorial plane of the tire CL and do not connect to the sipes 24A and 24D.

The angle (the acute angle) between each of the sipes 24A and the circumferential direction of the tire is nominally 70°. The angle (the acute angle) between each of the sipes 24B and the circumferential direction of the tire is nominally 70°. The angle (the acute angle) between each of the sipes 24C and the circumferential direction of the tire is nominally 70°. The angle (the acute angle) between each of the sipes 24D and the circumferential direction of the tire is nominally 70°. The angle (the acute angle) between the sipe 24E and the circumferential direction of the tire is nominally 70°. The angle (the acute angle) between each of the sipes 24F and the circumferential direction of the tire is nominally 70°.

Each of second blocks 26 are defined by the circumferential broad grooves 14, the circumferential narrow grooves 15 and the transverse grooves 20. Each second block 26 has sipes 28A extending from the end portion of the block in the vicinity of the circumferential broad groove 14, toward the block central area and inclined in a direction transverse to the direction of inclination of the transverse groove 20 and inclined with respect to the axial direction of the tire at a predetermined angle. Sipes 28B extend from the other end portion of the block, (the end portion in the vicinity of the circumferential narrow groove 15), toward the block central area and inclined in substantially the same direction as the direction of inclination of the transverse groove 20 and inclined with respect to the axial direction of the tire at a predetermined angle.

The sipes 28A and the sipes 28B are alternately disposed and intersect an imaginary common line extending along the circumferential direction of the tire and do not connect to each other in the central area of the block. In the present embodiment, the distance between the block central side end portions of the sipe 28A and the sipe 28B in the axial direction is nominally 4.5 mm.

The middle portion of the sipes 28A and 28B in the present embodiment are zigzag. The end portions of most of the sipes 28A and 28B in the vicinity of the end portions of the blocks or in the vicinity of the block central portion are substantially straight.

The angle (the acute angle) between each of the sipes 28A and the circumferential direction of the tire is nominally 78°.

The angle (the acute angle) between each of the sipes 28B and the circumferential direction of the tire is nominally 57°.

Each of third blocks 30 are defined by the circumferential narrow grooves 15, the circumferential broad grooves 16 and the transverse grooves 19. Each third block 30 has sipes 32A extending from the end portion of the block, which end portion is in the vicinity of the circumferential narrow groove 15, toward the central area of the block. The sipes 32A incline in a direction transverse to the direction of inclination of the transverse groove 19 and incline with respect to the axial direction of the tire at a predetermined angle. Sipes 32B extend from the other end portion of the block, which end portion is in the vicinity of the circumferential broad groove 16, toward the central area of the block and are inclined in substantially the same direction as the direction of inclination of the transverse groove 19 and are inclined with respect to the axial direction of the tire at a predetermined angle.

The sipes 32A and the sipes 32B are disposed alternately and intersect an imaginary common line extending along the circumferential direction of the tire and do not connect to each other in the central area of the block. In the present embodiment, the distance between the end portions of the sipe 32A and the sipe 32B, which end portions are in the vicinity of the center of the block, is nominally 5 mm.

The middle portion of the sipes 32A, and 32B in the present embodiment are zigzag. The end portions of most of the sipes 32A and 32B, which end portions are in the vicinity of the end portions of the blocks or in the vicinity of the inside of the block, are substantially straight.

The angle (the acute angle) between each of the sipes 32A and the circumferential direction of the tire is nominally 74°. The angle (the acute angle) between each of the sipes 32B and the circumferential direction of the tire is nominally 77°.

Each of the fourth blocks 34 which are defined by the circumferential broad grooves 16 and the transverse grooves 18 has sipes 36A extending from the end portion of the block, which end portion is in the vicinity of the circumferential broad groove 16, toward the central area of the block and inclined in a direction transverse to the direction of inclination of the transverse groove 18 and inclined with respect to the axial direction of the tire at a predetermined angle. Sipes 36B extend from the other end portion of tread toward the central area of the block and inclined in substantially the same direction as the direction of inclination of the transverse groove 18 and inclined with respect to the axial direction of the tire at a predetermined angle.

The sipes 36A and the sipes 36B are disposed alternately and intersect an imaginary common line extending along the circumferential direction of the tire and do not connect to each other in the central area of the block. In the present embodiment, the distance between the end portions of the sipe 36A and the sipe 36B, which end portions are in the vicinity of the center of the block, is nominally 5 mm.

The middle portions of the sipes 36A and 36B in the present embodiment are zigzag. The end portions of most of the sipes 36A and 36B, which are in the vicinity of the end portions of the block or in the vicinity of the central area of the block, are substantially straight.

The angle (the acute angle) between each of the sipes 36A and the circumferential direction of the tire is 70°. The angle (the acute angle) between each of the sipes 36B and the circumferential direction of the tire is 80°.

The negative ratio of the tread 12 of the present embodiment is set to 35%. In the present embodiment, the average width of the circumferential broad groove 14 is 8 mm, the average width of the circumferential narrow groove 15 is 2 mm, the average width of the circumferential broad groove 16 is 6 mm, the average width of the transverse groove 21 is 4 mm; the average width of the transverse groove 20 is 6.5 mm, the average width of the transverse groove 19 is 8 mm and the average width of the transverse groove 18 is 9 mm. The average widths of the sipes 24A, 24B, 24C, 24D, 24E, 24F, 28A, 28B, 32A, 32B, 36A and 36B are all 0.5 mm.

The effect of the pneumatic tire 10 of the present embodiment is described following paragraphs.

(1) In the pneumatic tire 10 of the present embodiment, a pair of circumferential grooves 14, a pair of circumferential narrow grooves 15 and a pair of circumferential broad grooves 16 are disposed in the tread 12. Therefore, good straight line stability and cornering is obtained when driving on snow.

(2) Pluralities of transverse grooves 18, transverse grooves 19, transverse grooves 20 and transverse grooves 21 are disposed in the tread 12. Therefore, a good traction and braking can be obtained for driving on snow.

(3) Each of the sipes 24A, 24B, 24C, 24D, 24E, 28A, 28B, 32A, 32B, 36A and 36B opens when the sipe contacts the surface of snow and snow penetrates into the open sipe. Therefore, properties can be improved for driving on snowy roads.

(4) The transverse grooves 18, the transverse grooves 19, the transverse grooves 20 and the transverse grooves 21 are inclined with respect to the axial direction of the tire. Therefore, good cornering properties can be obtained in driving on icy or snowy roads.

(5) In the first blocks 22, the sipes 24A and the sipes 24C are inclined in directions opposite to each other. The sipes 24B and the sipes 24D are inclined in opposite directions. In the second blocks 26, the sipes 28A and the sipes 28B are inclined in opposite directions. In the third blocks 30, the sipes 32A and the sipes 32B are inclined in opposite directions. In the fourth blocks 34, the sipes 36A and the sipes 36B are inclined in opposite directions. Therefore, even when force is applied to the tire in the direction parallel with the sipes extending from one end portion of the block, i.e., in a direction in which an edge effect by these sipes cannot be obtained, edge effect can be obtained by the sipes extending from the other end portion of the block. The edge effect can be obtained against force applied to the tire in any direction. Thus, cornering properties on ice in which the sipes are particularly effective can be improved.

In blocks disposed in the central portions of the tire 12, which are the first blocks 22 and the second blocks 26 adjacent to the first blocks in the present embodiment, the effect of the sipe edges in the circumferential direction of the tire decreases and the traction and braking properties deteriorate when the angle between the sipe and the circumferential direction is smaller than 45°. When the above angle exceeds 85°, the angle between a sipe extending from one end portion of the block and a sipe extending from the other end portion of the block nears 180° and the effect of improved cornering performance on ice decreases.

(6) In the central portions of each of the first blocks 22, the second blocks 26, the third blocks 30 and the fourth blocks 34, the sipes extending from one end portion of the block and sipes extending from the other end portion of the block intersect the imaginary common line extending along the circumferential direction of the tire. Therefore, the number of sipe edge components in the central area of the blocks is greater than that in the peripheral areas of the block. Since the density of sipes is high in the central area of the blocks where the film of water tends to be formed in driving on icy roads, the water film absorption is enhanced and braking and traction properties are improved for driving on icy roads.

(7) The density of sipes in the peripheral areas of the blocks (in the end portions of the blocks) is low although the density of the sipes in the central area of the blocks is high. Therefore, rigidity of the central area of the blocks can be decreased while rigidity in the peripheral portions of the blocks is sufficient. Thus, a sufficient area of the block contacting the road surface can be obtained while collapsing of the blocks is suppressed when force is applied to the tire. Hence, controllability on dry or wet roads can be further improved.

(8) Due to the shape of the sipes 24A, 24B, 24C, 24D, 28A, 28B, 32A, 32B, 36A and 36B having a plurality of bending (i.e., formed in a zigzag pattern or a waved pattern in the central area of the blocks), the effective length of the sipes can be increased and water film on ice can be more effectively absorbed. Since the number of edge components which are effective in force along the circumferential or transverse direction of the tire can be increased, and in particular, cornering performance on ice can be improved.

Due to the shapes of the end portions of the sipes 24A, 24B, 24C, 24D, 28A, 28B, 32A, 32B, 36A and 36B, which end portions are in the peripheral areas of the blocks, which shapes are substantially straight, the angle between each of the end portions of the sipes and the end portion of the block in each block can be made substantially the same and uneven wear of the blocks can be suppressed.

Due to the shape of the end portions of the sipes 24A, 24B, 24C, 24D, 28A, 28B, 32A, 32B, 36A and 36B, in the central area of the blocks, which shapes are substantially straight, the sipes more easily open in comparison with sipes whose entire shapes are zigzag or wavy. This permits snow to easier penetrate into the sipes. Thus, the properties on snow can be improved in comparison with sipes having substantially an entire shape that is zigzag or wavy.

(9) By setting the angle between each of the sipes and the circumferential direction of the tire in the blocks which are located in the side areas of the tread at a value greater than the angle between each of the sipes and the circumferential direction of the tire in the blocks which are located in the central area of the tread (i.e., by disposing the sipes 36B in the fourth blocks 34 which are located in the vicinity of the shoulder in a direction closer to the axial direction of the tire), uneven wear can be suppressed, which tends to take place in portions around the shoulder.

(10) By arranging all sipes extending from the same end portion of the block in a manner such that the sipes are inclined in the same direction and the distances between adjacent sipes in the circumferential direction of the tire are the same, as shown in the second blocks 26, the third blocks 30 and the fourth blocks 34 change in rigidity depending on the direction of the applied force, can be prevented and uneven wear suppressed. By forming this structure in blocks arranged along the circumferential direction of the tire, blocks arranged along the circumferential direction of the tire tend to wear more uniformly.

In the first blocks 22, rigidity can be improved by suitably arranging the sipes 24A, 24B, 24C, 24D, 24E and 24F.

(11) Because the block pattern which is formed by the first blocks 22, the two second blocks 26, the two third blocks 30, and the two fourth blocks 34 along the axial direction of the tire is repeated around the circumferential direction of the tire, no matter which portion of the tire makes contact with the road, substantially the same edge effect can be obtained.

The dimensions and the angles are not limited to those described above and can be changed suitably as long as the effect of the present preferred embodiment is not adversely affected.

Figure 4:
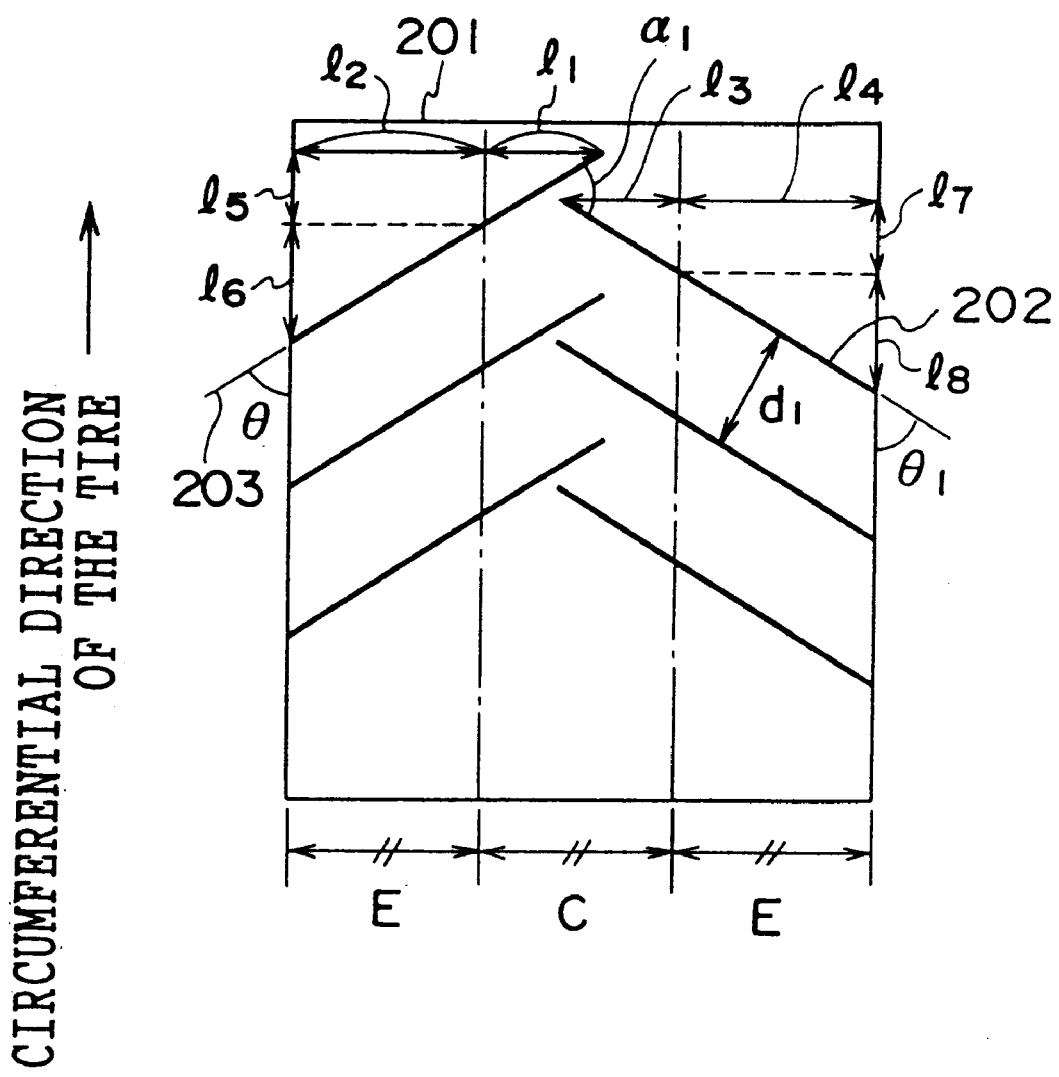
FIG. 4 is an enlarged plan view of a block of a tread of a second preferred embodiment of a pneumatic tire in accordance with the present invention.

An enlarged view of one of tread blocks of a second preferred embodiment of a pneumatic tire in accordance with the present invention is shown in FIG. 4. In FIG. 4, the shapes of sipes 202, and 203 are substantially straight. When the shapes of sipes are zigzag or wavy, the straight line shown in FIG. 4 can be regarded as the central line of such sipes. In the preferred embodiment shown in FIG. 4, the sipes 202 and 203 are disposed in blocks 201. The sipes 202 and 203 are inclined in directions transverse or opposite to each other and the end portions thereof which are located in the central area of the block intersect a central line of the block, which central line extends along the circumferential direction of the tire. The angle $\alpha_1$ between the extended line of each of the sipes 202 and each of the sipes 203 is 10 to 90° and preferably 15 to 30°. When the angle $\alpha_1$ is smaller than 10°, the effect of the sipes for force applied from the axial direction of the tire is insufficient. When the angle $\alpha_1$ exceeds 90°, the effect of the sipes for force applied from the circumferential direction of the tire is also insufficient. The angle (the acute angle) $\theta_1$ between each of the sipes 202 and the circumferential direction of the tire and the angle $\theta_2$ between the sipes 203 and the circumferential direction of the tire are each set in a range of 45 to 85°. When any of these angles is smaller than 45°, the effect of the sipes for force applied in the circumferential direction of the tire is insufficient. When any of these angles exceeds 85°, the effect of the sipes for force applied in the axial direction of the tire is insufficient.

The distance $d_1$ between the sipes which extend from the same end portion and are adjacent to each other is 2 to 5 mm. When this distance $d_1$ is smaller than 2 mm, risk of defects during tire manufacturing tends to be unsatisfactory. When this distance $d_1$ exceeds 5 mm, the density of the sipes is low and the sipe effect is insufficient.

Therein, $\omega_c$ is defined as a total length, in the circumferential direction of the tire, of respective portions of the sipes 202 and 203, which portions are located within a central area C disposed along a center line of the block extending along the circumferential direction and whose width is a third of the block width, i.e., $(l_5+l_7)$, $\delta_c$ is defined as a total length, in the axial direction of the tire, of those, i.e., $(l_1+l_3)$. $\omega_e$ is defined as the longer of a length, in the circumferential direction of the tire, of a portion of the sipe 202, which portion is located in an end area E adjacent to the central area C and whose width is a third of the block width, and a length, in the circumferential direction of the tire, of a portion of the sipe 203, which portion is located in the other end area E adjacent to the central area C and whose width is a third of the block width, i.e., the greater one between $l_6$ and $l_8$. $\delta_e$ is defined as the longer of a length, in the axial direction of the tire, of the portion of the sipe 202, which potion is located in the end area E, and a length, in the axial direction of the tire, of the portion of the sipe 203, which portion is located in the other end area E, i.e., the greater one between $l_2$ and $l_4$. It is preferable that $\omega_c$, $\omega_e$, $\delta_c$, and $\delta_e$ have relations: $\omega_c > \omega_e$ and $\delta_c > \delta_e$.

Figure 5:
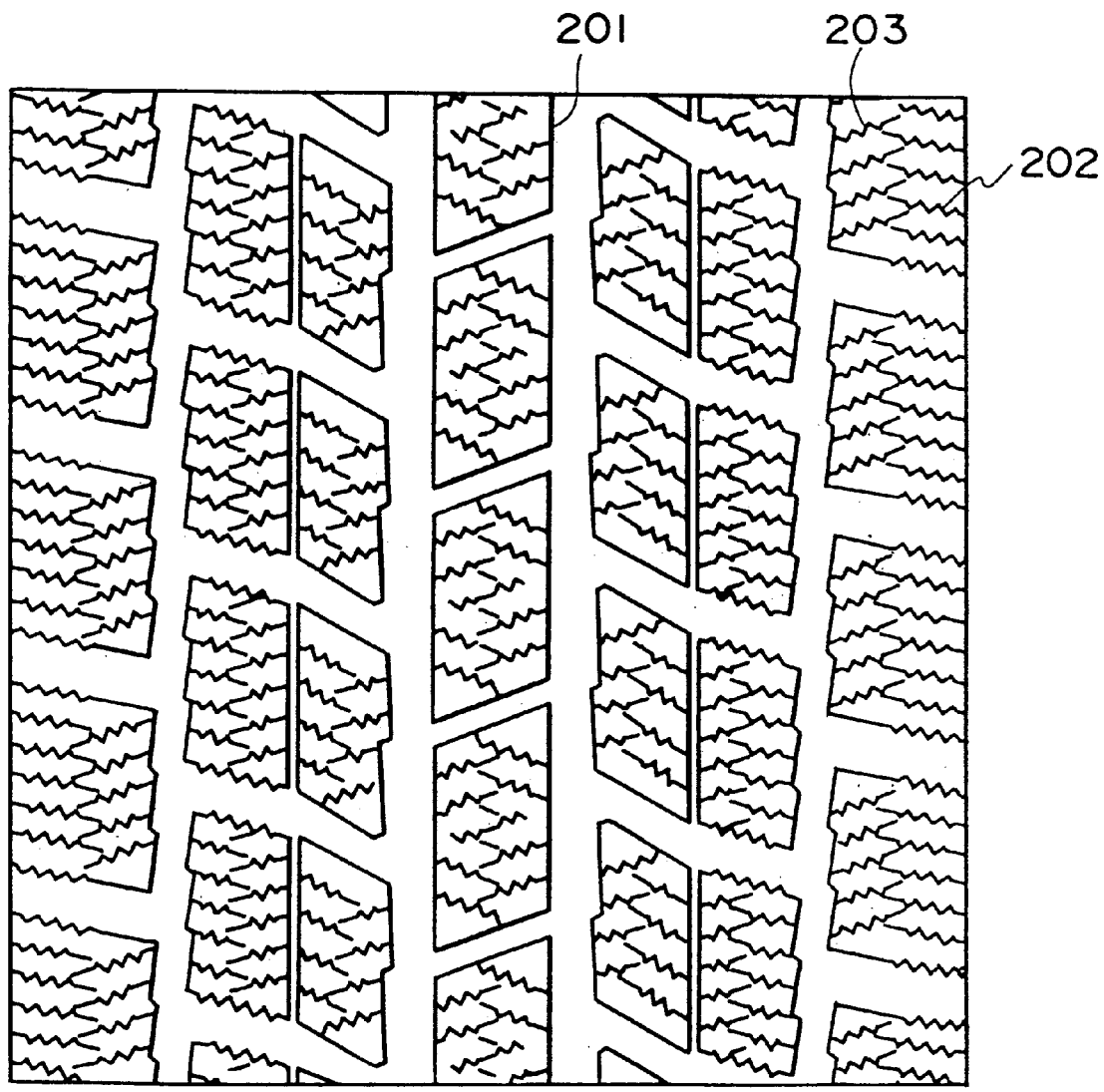
FIG. 5 is a plan view of a tread of a pneumatic tire having blocks according to the block shown in FIG. 4.
Figure 27:
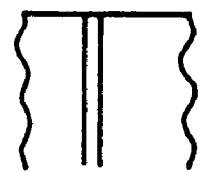
FIGS. 27 and 28 show cross-sections of the sipes.
Figure 28:
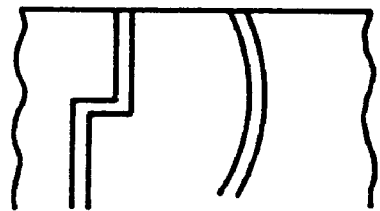
Figure 29:
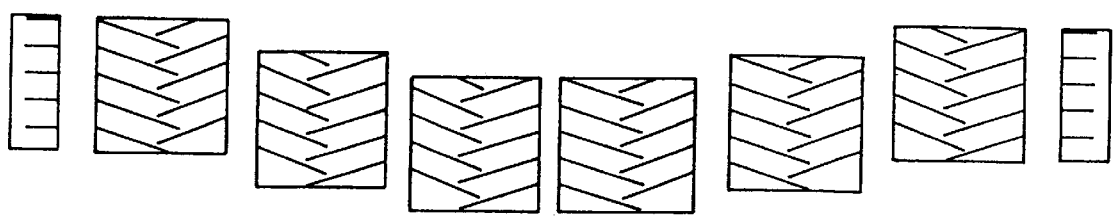
FIGS. 29 through 41 are plan views of block patterns used in the Examples.
Figure 30:
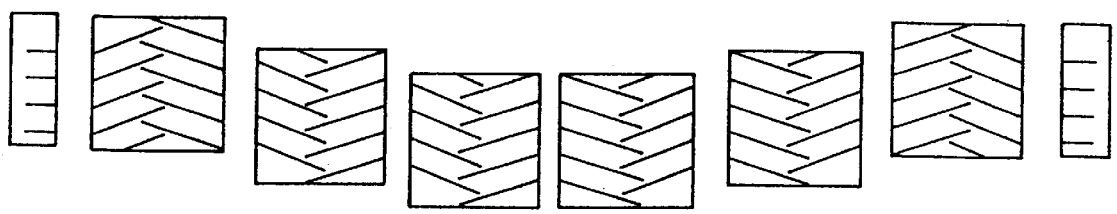
Figure 31:
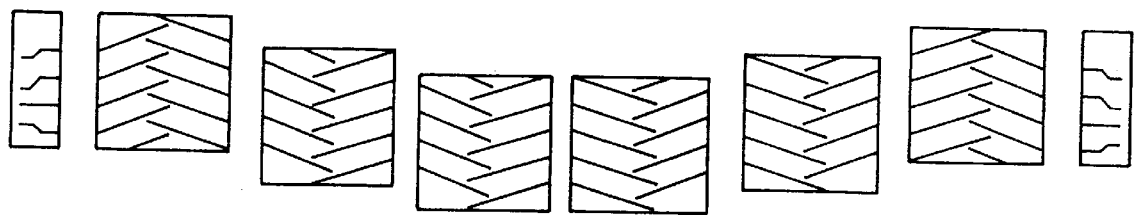
Figure 32:
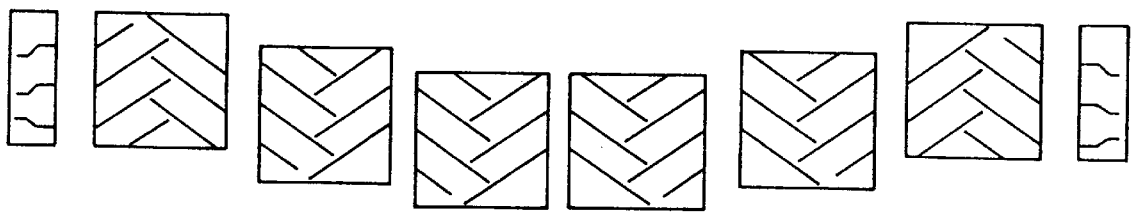
Figure 33:
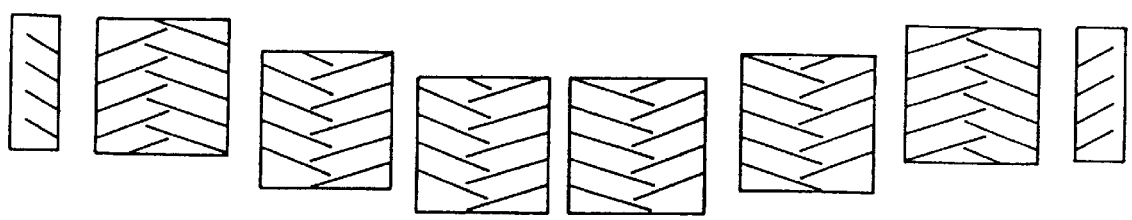
Figure 34:
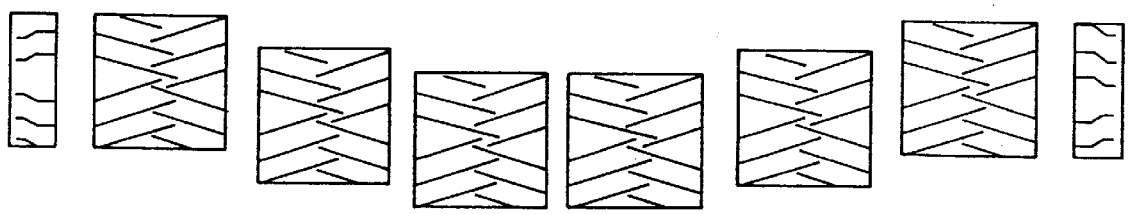
Figure 35:
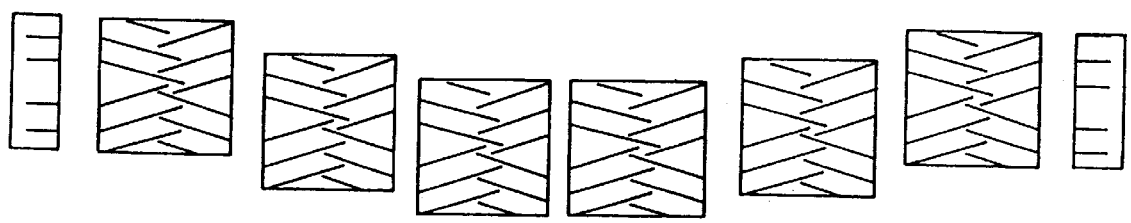
Figure 36:
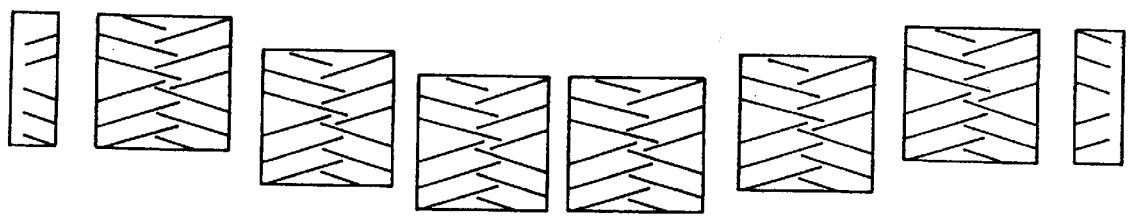
Figure 37:
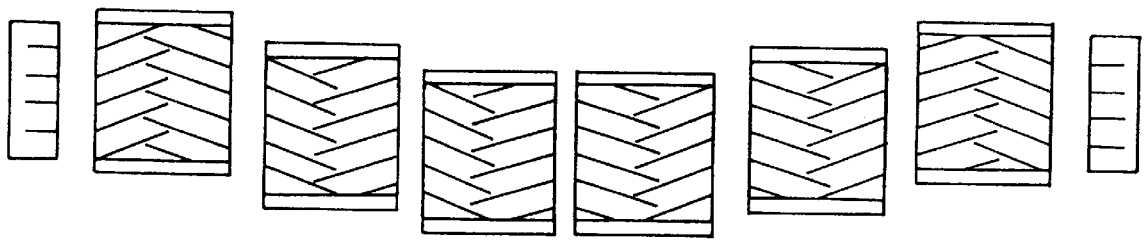
Figure 38:
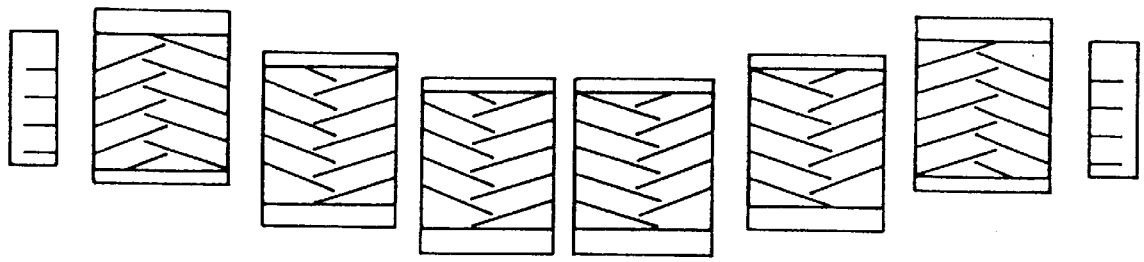
Figure 39:
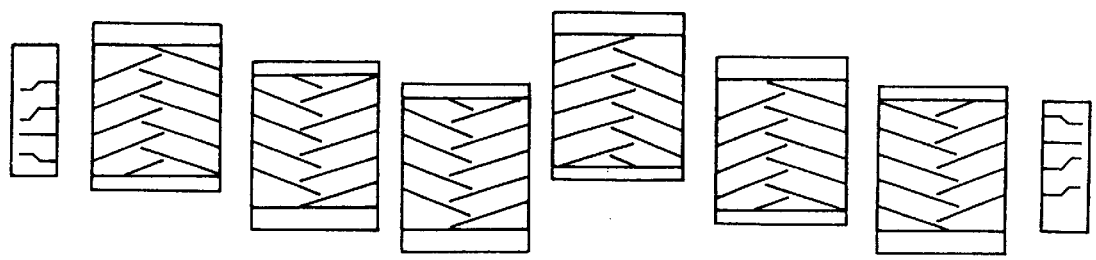
Figure 40:
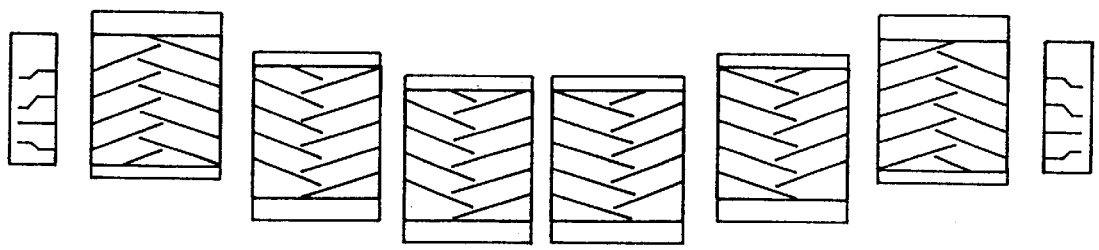
Figure 41:
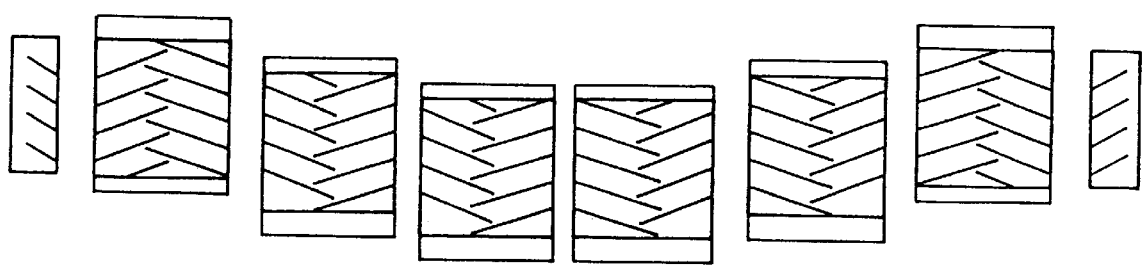

A preferable example of the tread pattern of the second preferred embodiment of the pneumatic tire is shown in FIG. 5. In the tread block 201 shown in FIG. 5, sipes 202 and 203 satisfying the above conditions are disposed. Since the shapes of the sipes 202 and 203 are wavy, impored edge effects can be obtained. The sipe may be formed in a straight line in the depth direction of the blocks, as shown in FIG. 27, or may be inclined with respect to the radial direction of the tire, or bend or curve, as shown in FIG. 28. Each block 201 has four or more sipes which bend or curve in the depth direction of the blocks. The depth of both end portions of the sipes 202 and 203 are shallower than the depth of the central portions of the sipes 202 and 203 (not shown in FIG. 5). When the tread having such a construction is made of an expanded rubber, the properties when driving on snowy or icy roads can be further improved.

In expanded rubber, it is preferable that the average diameter of closed cells is 20 to 60 $\mu$m and the degree of expansion is 3 to 50%. When the average diameter of closed cells is smaller than 20 $\mu$m, water removal effect is not sufficient. When the average diameter of closed cells exceeds 60 $\mu$m, abrasion resistance deteriorates. Similarly, when the degree of expansion is smaller than 3%, the improvement in the properties when driving on icy roads is insufficient. When the degree of expansion exceeds 50%, abrasion resistance deteriorates. The degree of expansion $V_s$ is obtained by measuring the density $\rho_1$ (g/cm$^3$) of a sample of a foamed block and the density $\rho_0$ (g/cm$^3$) of the rubber before being foamed (the solid rubber phase), followed by calculation in accordance with the equation:

$$V_s=(\rho_0/\rho_1-1)\times100\%$$

Examples of the foaming agent used for preparation of the expanded rubber include ammonium hydrogencarbonate and sodium hydrogencarbonate which generate carbon dioxide and nitrososulfonylazo compounds which generate nitrogen such as dinitrosopentamethylenetetramine (DTP), N,N'-dimethyl-N,N'-dinitrosophthalamide, azodicarbonamide (ADCA), N,N'-dinitrosopentamethylenetetramine, benzenesulfonylhydrazide, toluenesulfonylhydrazide, p,p'-oxy-bis(benzenesulfonylhydrazide) (OBSH), p-toluenesulfonylsemicarbazide and p-p'-oxy-bis-(benzenesulfonylsemicarbazide). The foaming agent can be suitably selected in accordance with the vulcanization temperature. An auxiliary foaming agent such as urea may be used. Among these agents, a combination of ADCA, OBSH or DBP with urea is preferable.

As the rubber component as the matrix rubber of the expanded rubber, natural rubber (NR), polystyrene-butadiene rubber (SBR), polybutadiene rubber (BR), polyisoprene rubber (IR) and a blend of these rubbers with other rubbers can be used. The rubber component should not be particularly limited thereto.

In the expanded rubber used in the present invention, fillers such as carbon black, antioxidants, waxes, vulcanization accelerators, vulcanizing agents, silane coupling agents, dispersants, stearic acid, zinc oxide and softeners such as aromatic oils, naphthenic oils, paraffinic oils and ester plasticizers and liquid polymers such as liquid polyisoprene rubber and liquid polybutadiene rubber may be suitably used in addition to the above compounding ingredients.

Figure 6:
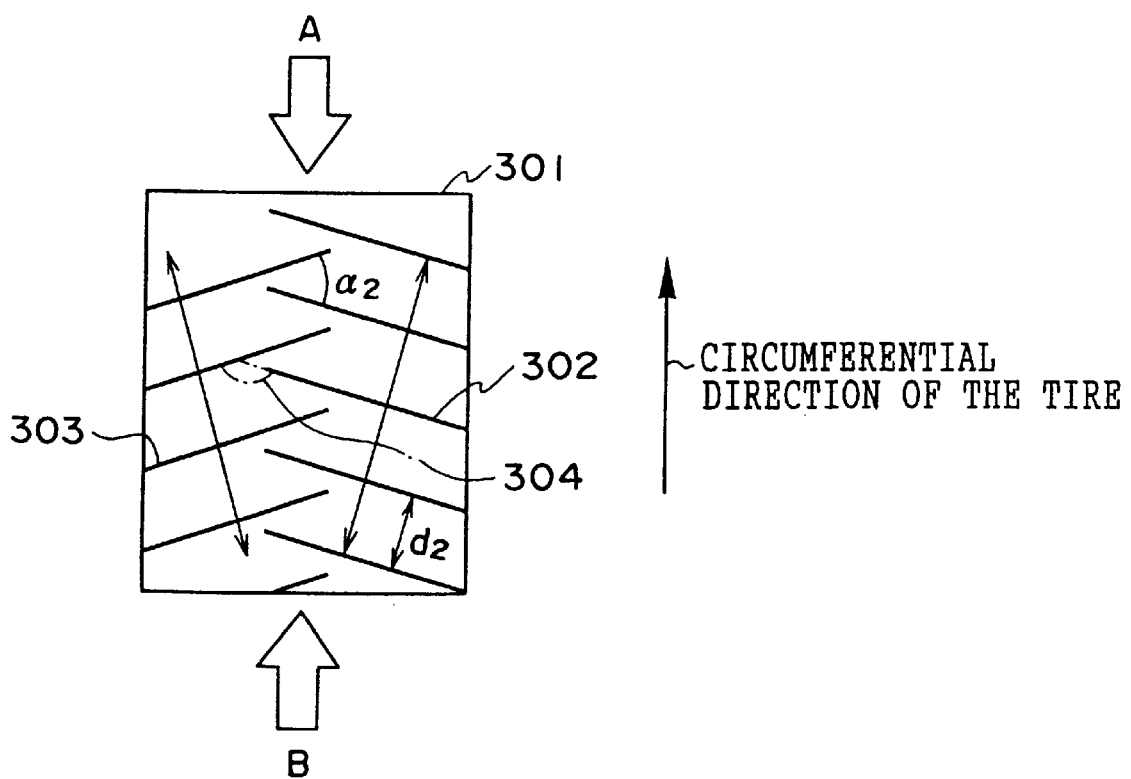
FIG. 6 is an enlarged plan view of a block of a tread of a third preferred embodiment of a pneumatic tire in accordance with the present invention.

An enlarged view of one of tread blocks of a third preferred embodiment of a pneumatic tire in accordance with the present invention is shown in FIG. 6. In the preferable example shown in FIG. 6, sipes 302 and 303 are formed in the block 301. The sipes 302 are substantially parallel with each other, while the sipes 303 substantially parallel one another. The sipes 302 and the sipes 303 are inclined in transverse of opposite directions to each other. The end portions thereof which are located in the block central area intersect a central line of the block extending along the circumferential direction of the tire. The sipes 302 and the sipes 303 are disposed alternately and form pairs of a sipe 302 and a sipe 303. The angle $\alpha_2$ between the extended line of the sipe 302 and the sipe 303 is preferably 15 to 90°. When this angle is smaller than 15°, block collapse (falling down) between the sipes increases when driving. When the angle exceeds 90°, uneven wear such as heal-and-toe wear tends to take place depending on the condition of use. The distance $d_2$ between the sipes which extend from the same end portion of the block and are adjacent to each other is preferably 2.5 to 10 mm in the present embodiment. When the distance is smaller than 2.5 mm, rigidity of the block decreases and controllability on dry road surfaces deteriorates. When the distance exceeds 10 mm, braking properties on ice deteriorate and the tire cannot satisfactorily as function a studless tire.

By forming the above sipes 302 and 303 in the block 301, the effect of the sipes is present for force applied in multiple directions. Moreover, a higher density of the sipes can be achieved in the central area of the block. However, rigidity of the block 301 against force applied from the forward direction is different from that against force applied from the backward direction when the tire whose block pattern is comprised of the block 301 alone. Specifically, in the block shown in FIG. 6, the sipes are closed by deformation of the block when force is applied from the upper position in the figure as shown by the arrow A. The sipes are open when force is applied from the lower position in the figure as shown by the arrow B. As a result, rigidity of the block decreases either in braking or in traction and sufficient resistance to uneven abrasion cannot be obtained.

Figure 7A:
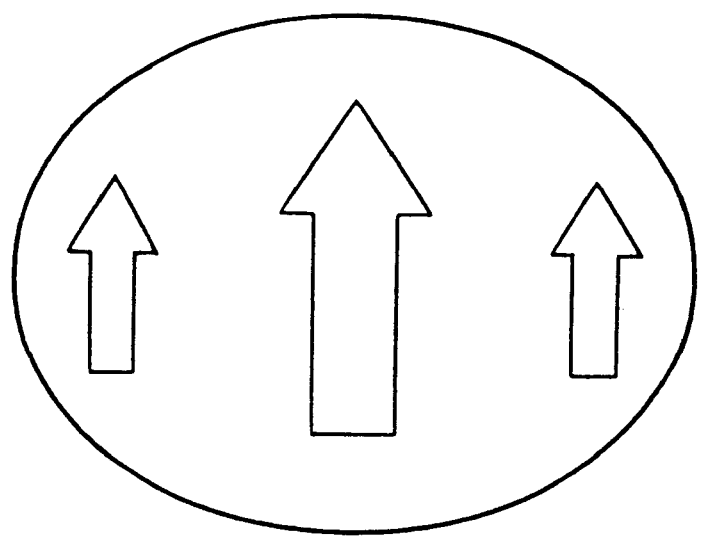
FIG. 7A is a diagram showing vectors of forces generated in the surface of a tire contacting a road surface during traction thereagainst.
Figure 7B:
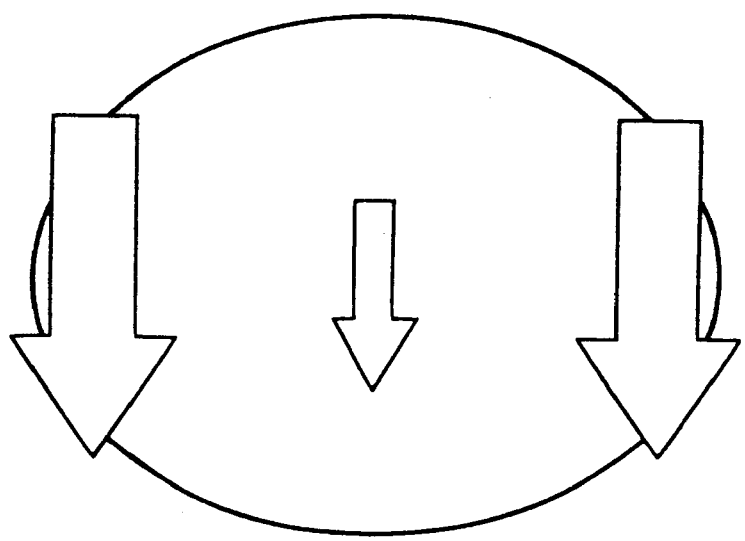
FIG. 7B is a diagram showing vectors of forces generated in the surface of a tire contacting the road surface during braking.

In FIG. 7, the vectors of the forces generated in the area contacting the road surface in braking and in traction are schematically shown. Although the strength of the force varies depending on the shapes of the tread and the tire carcass, schematically, the applied force is mainly supported by the central area in traction, as shown in FIG. 7A, and by the shoulder areas in braking, as shown in FIG. 7B. In other words, in traction, the force applied to the central area of the area contacting the road surface is stronger than the force applied to the shoulder portion. In braking, the force applied to the shoulder areas of the area contacting the road surface is stronger than the force applied to the central portion.

Therefore, in the third preferred embodiment of a pneumatic tire in accordance with the present invention, the tread is divided into the central area disposed along the central line of the tread in the circumferential direction of the tire and occupies 30 to 70% of the entire width of the area contacting the road surface and two shoulder areas (side areas) at both sides of the central area. The direction of the apex of chevrons (304 in FIG. 6) formed by one of the sipes 302 and 303 and an extended line of the other in the blocks located in the central area of the tread and that in the blocks located in the side area of the tread are opposite to each other with respect to the circumferential direction of the tire. Thus, the arrangement of the sipes is optimized for both braking and traction.

Figure 8:
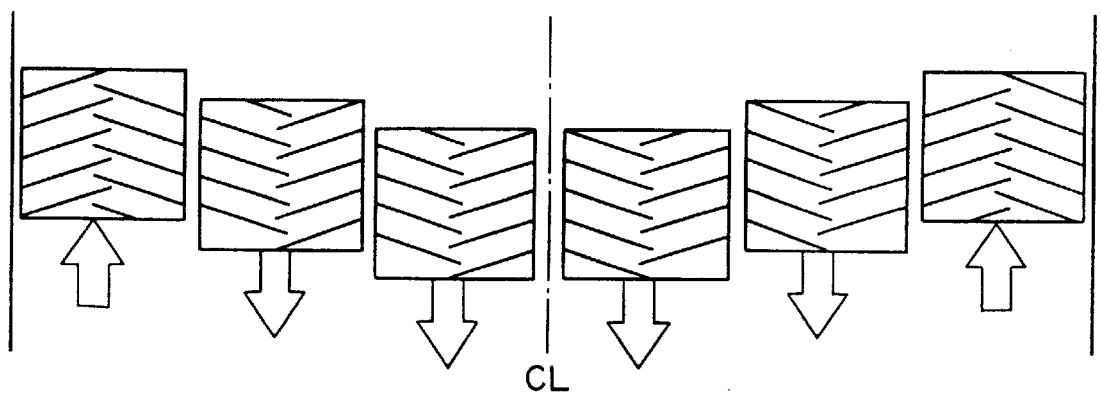
FIGS. 8 and 9 are plan views of a tread of a pneumatic tire having the blocks according to the block of FIG. 6.
Figure 9:
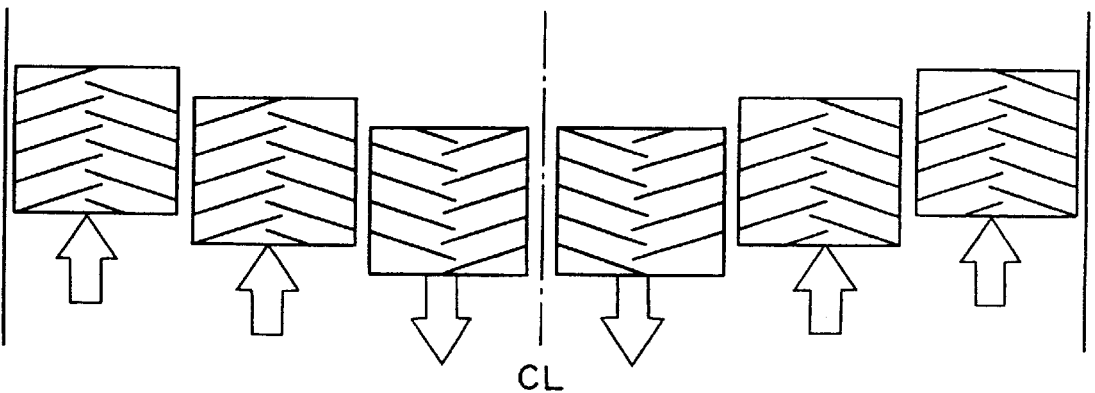

Preferred examples of the tread pattern of the pneumatic tire of the present embodiment are shown in FIGS. 8 and 9. The arrangement of sipes shown in FIG. 8 is more effective for traction than in breaking. In contrast, the arrangement of sipes shown in FIG. 9 is more effective for braking than for traction. Both FIGS. 8 and 9 show the surface of the tire contacting the road surface (the lower surface of the tire) when the tire is in use on a vehicle.

When the pneumatic tire of the present embodiment is a studless tire, it is preferable that rubber for the tread is an expanded rubber having a degree of expansion of 10 to 50%. When the degree of expansion is smaller than 10%, the improvement in the properties on ice is insufficient. When the degree of expansion exceeds 50%, abrasion resistance deteriorates. It is preferable that the average diameter of closed cells is 20 to 60 $\mu$m. When the average diameter of closed cells is smaller than 20 $\mu$m, the water removal effect is not sufficient. When the average diameter exceeds 60 $\mu$m, abrasion resistance deteriorates. The degree of expansion can be obtained in accordance with the equation described previously.

Examples of the foaming agent, the auxiliary foaming agent and the preferable combination of these agents used for preparation of the expanded rubber are the same as those described earlier. Examples of the rubber component used as the matrix rubber in the expanded rubber include the same rubbers as those described above. The additives used in the expanded rubber in the present embodiment are also the same as those described above.

In the present embodiment of the pneumatic tire, the structure and the materials of members other than the tread can be determined in accordance with conventional practice.

Figure 10A:
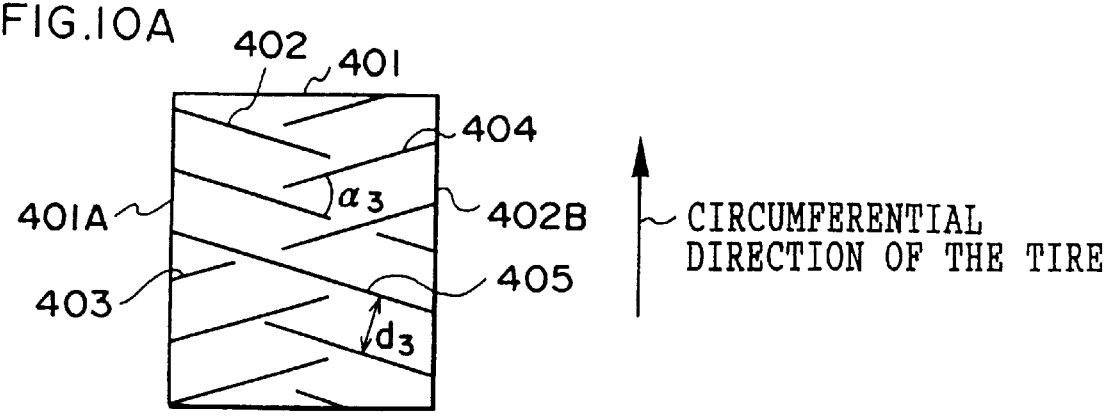
FIGS. 10A, 10B and 10C are enlarged plan views of a block of a tread of a fourth preferred embodiment of a pneumatic tire in accordance with the present invention.
Figure 10B:
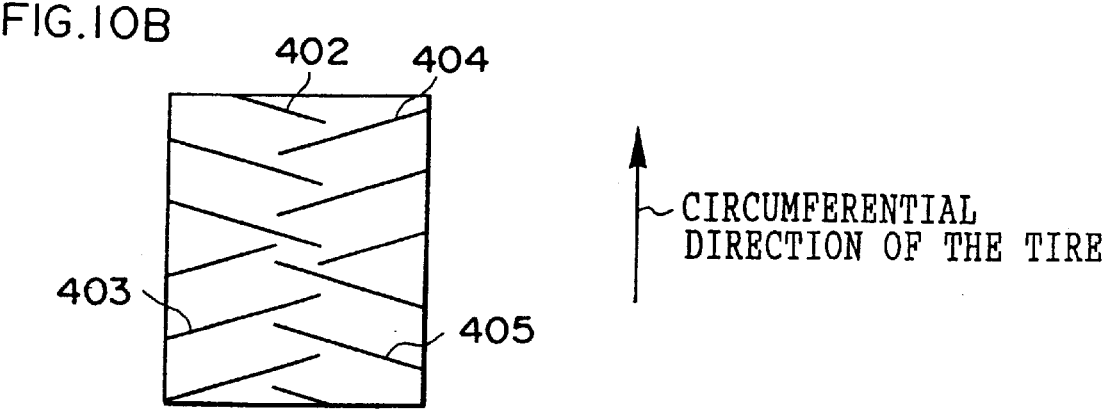
Figure 10C:
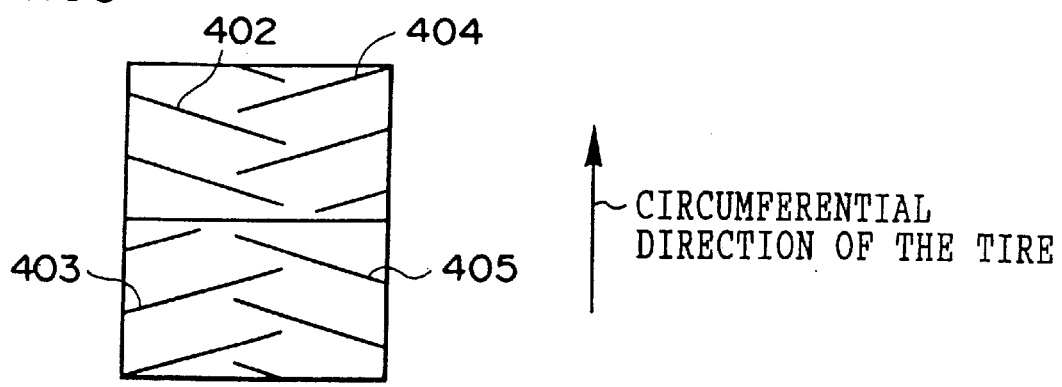

FIGS. 10A, 10B and 10C show enlarged plan views of a tread of a fourth preferred embodiment of a pneumatic tire in accordance with the present invention. To decrease the difference between rigidity of blocks in traction and in braking, and to achieve improved resistance to uneven wear, and stable controllability independent of the direction of applied force, each block is imagined as being divided into two equal portions located along the circumferential direction of the tire, with an apex of a chevron formed by one of two sipes forming a pair, and an extended line of the other sipe of the pair in the half portion of the block facing that in the other half portion.

As shown in FIG. 10A, each block in the pattern, includes sipes 402, 403, 404 and 405. The sipes 402 are disposed in an upper left area of the block 401, extending from an edge 401A extending along the circumferential direction of the tire and inclined with respect to the axial direction of the tire at a predetermined angle. The sipes 403 are disposed in a lower left area of the block 401, extend from the edge 401A and are inclined with respect to the axial direction of the tire at a predetermined angle. The sipes 404 are formed in an upper right area of the block 401, extending from the opposite edge 401B extending along the circumferential direction of the tire and inclined with respect to the axial direction of the tire at a predetermined angle. The sipes 405 are formed in a lower right area of the block 401, extending from the edge 401B and inclined with respect to the axial direction of the tire at a predetermined angle. The sipes 402 and 404 are inclined in directions opposite to each other. The sipe 402 and the sipe 404 are disposed alternately, form a pair and intersect a central line of the block extending along the circumferential direction of the tire and do not intersect each other. The sipes 403 and 405 are inclined in directions opposite to each other. The sipe 403 and the sipe 405 are disposed alternately, form a pair and intersect a central line of the block extending along the circumferential direction of the tire and do not intersect each other. The apex of a chevron formed by one of the sipes 402 and 404 forming each pair and an extended line of the other sipe of the pair faces the apex of a chevron formed by one of the sipes 403 and 405 forming a pair and an extended line of the other sipe of the pair.

In FIG. 10A, the sipe 402 and the sipe 405 disposed in the central area of the block are connected to each other. Each sipe 402 is disposed at a position lower than that of the sipe 404 forming a pair with this sipe 402. Each sipe 403 is disposed at a position higher than that of the sipe 405 forming a pair with this sipe 403.

Each block formed in the tread of the pneumatic tire of the fourth preferred embodiment may be a block shown in FIG. 10B or a block shown in FIG. 10C. In FIG. 10B, the sipes 402 and the sipes 405 disposed at the central area of the block are not connected to each other. Each sipe 402 is disposed at a position higher than that of the sipe 404 forming a pair with this sipe 402. In FIG. 10C, the relative positions of the sipes forming a pair are the same as those in FIG. 10B. When each block is divided imaginarily into two portions by a central line passing through the center of the block in the circumferential direction of the tire and parallel with the axial direction of the tire, there are no sipes disposed over both portions.

In the present embodiment, the preferable range of the angle $\alpha_3$ between the one of two sipes forming a pair and an extended line of the other sipe of the pair, the preferable range of the distance $d_3$ between sipes extending from the same area of each block, for example, sipes 405 extending from the lower right area and the reasons for the ranges are the same as those in the third preferred embodiment.

When the pneumatic tire of the present embodiment is a studless tire, it is preferable that rubber for the tread is an expanded rubber similar to that of the pneumatic tire of the third preferred embodiment. The preferable degree of expansion and the preferable range of the average diameter of closed cells are also the same as those in the third preferred embodiment. Further, examples of the foaming agent and the auxiliary foaming agent, the preferable combinations thereof, the examples of the rubber component used as the matrix and the examples of the additives used in the expanded rubber are the same as those in the third embodiment.

In the pneumatic tire of the fourth preferred embodiment, the structure and the materials of members other than the tread can be determined in accordance with conventional practice.

Figure 11A:
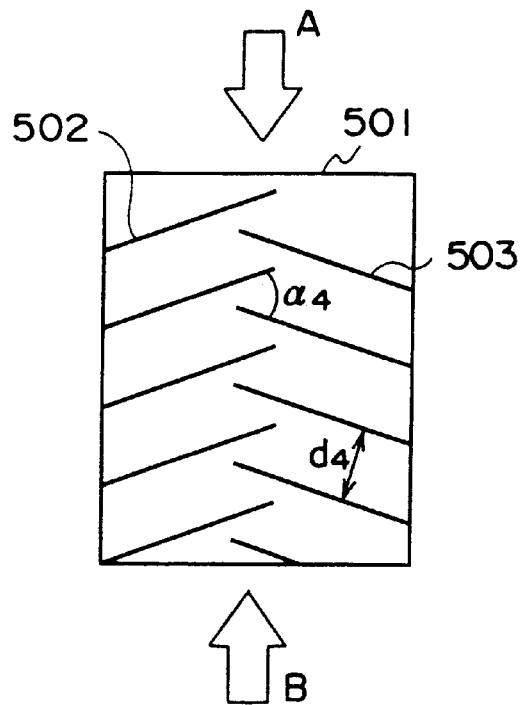
FIG. 11A is an enlarged plan view of a block of a tread of a fifth preferred embodiment of a pneumatic tire in accordance with the present invention.
Figure 11B:
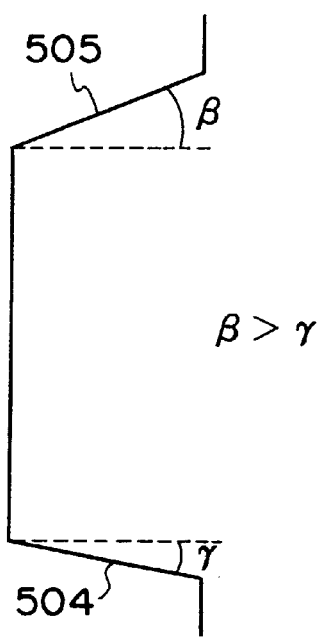
FIG. 11B is a side view of the block of FIG. 11A.

FIG. 11 illustrates a fifth preferred embodiment in accordance with the present invention. To decrease the difference between rigidity of blocks in traction and in braking and to achieve improved resistance to uneven wear and stable controllability independent of the direction of the applied force, the angle between the radial direction of the tire and a side wall at the side of the apex of a chevron formed by one of two sipes forming each pair and an extended line of the other sipe of the pair, is made greater than the angle between the radial direction of the tire and a side wall at the side opposite to the apex of the chevron.

As shown in FIG. 11, in each block 501 of the pattern, sipes 502 and 503 are disposed. Each sipe 502 extends from one edge of the block 501 extending along the circumferential direction of the tire and is inclined to the axial direction of the tire at a predetermined angle. Each sipes 503 extends from the other edge of the block 501 extending along the circumferential direction of the tire and is inclined with respect to the axial direction of the tire at a predetermined angle. The sipes 502 and 503 are inclined in opposite directions. The sipe 502 and the sipe 503 are disposed alternately, form a pair and intersect a central line of the block extending along the circumferential direction of the tire without intersecting each other.

When the sipes are formed as described above, as shown with the third preferred embodiment, rigidity of the block against force applied from the side of the apex of the chevron formed by one of the sipes 502 and 503 forming a pair and an extended line of the other sipe of the pair (shown by the arrow A) is greater than rigidity of the block to force applied from the opposite side (shown by the arrow B).

Figure 12A:
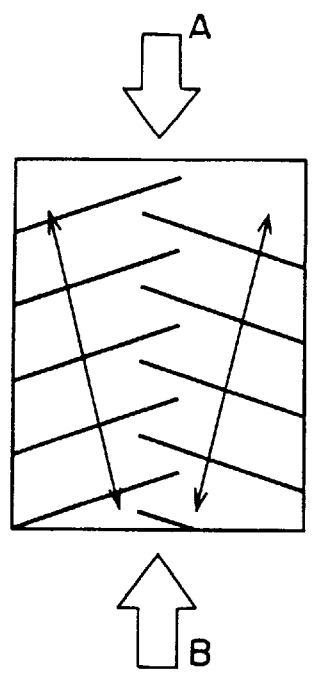
FIG. 12A is a plan view of a block in which the angle between the radial direction of the tire and one of two side walls extending in the axial direction of the tire and the angle between the radial direction of the tire and the other side wall are the same.
Figure 12B:
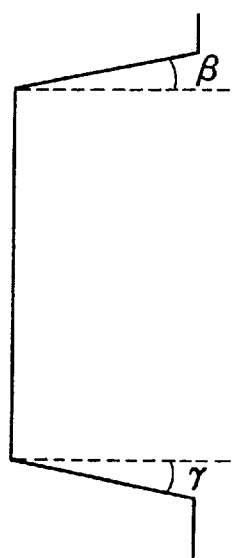
FIG. 12B is a side view of the block of FIG. 12A.

As shown in FIG. 12, when the angle $\beta$ between the side wall at the side of the apex of the chevron and the radial direction of the tire is the same as the angle $\gamma$ between the side wall at the opposite side and the radial direction of the tire, the above difference in rigidity of the block having the sipes described above remains unchanged.

In contrast, as shown in FIG. 11, when the angle $\beta$ between the side wall 505 at the side of the apex of the chevron and the radial direction of the tire is greater than the angle $\gamma$ between the side wall 504 at the opposite side of the side wall 505 and the radial direction of the tire, the degree that rigidity of the block against force applied in the direction shown by arrow A is reinforced by the side wall 504, is smaller than the degree that rigidity of the block against the force applied in the direction shown by arrow B is reinforced by the side wall 505. The difference in rigidity of the block between the forward direction and the backward direction, which arises from the sipes described above, can be cancelled by this effect. It is preferable that the difference between the angle $\beta$ and the angle $\gamma$ is 3° or less.

Figure 13:
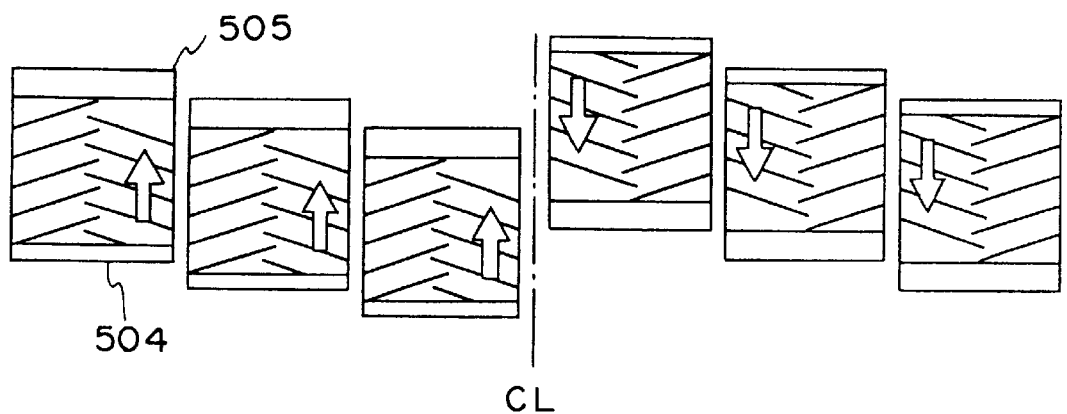
FIG. 13 is a plan view of a tread of a pneumatic tire having the block shown in FIG. 11.
Figure 14:
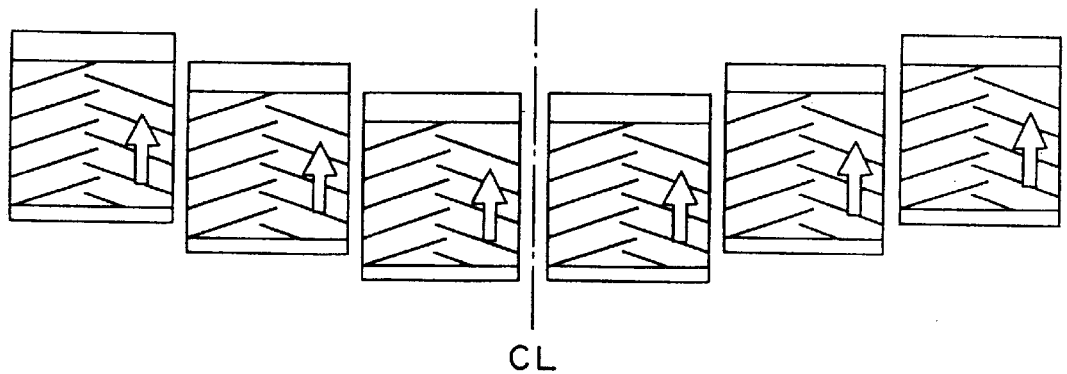
FIG. 14 is a plan view of a tread of another pneumatic tire having the block shown in FIG. 11.
Figure 15:
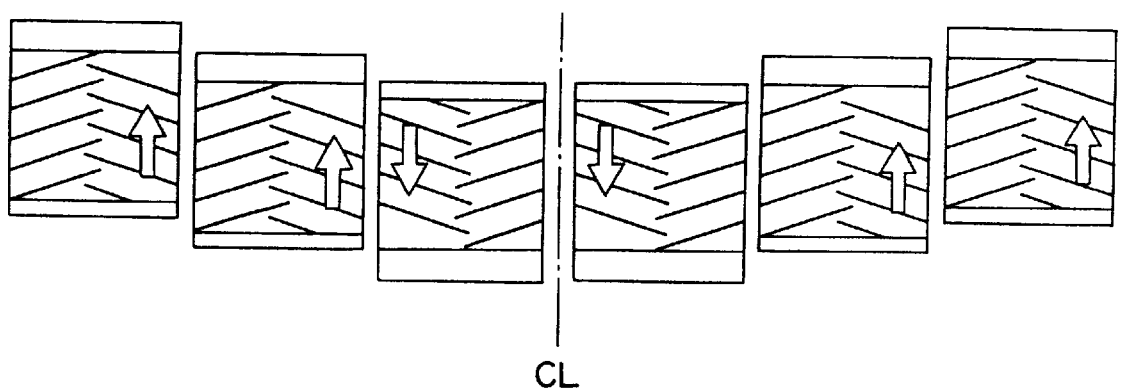
FIG. 15 is a plan view of a tread of still another pneumatic tire having the block shown in FIG. 11.

Preferable examples for tread patterns for the present embodiment are shown in FIGS. 13 to 15.

In the present embodiment, the preferable ranges of the angle $\alpha_4$ between one of two sipes forming each pair and an extended line of the other sipe of the pair (FIG. 11), the preferable ranges of the distance $d_4$ between sipes extending from the same end portion of the block and the reasons for the ranges are the same as those in the third preferred embodiment.

When the pneumatic tire of the present embodiment is a studless tire, it is preferable that rubber for the tread is an expanded rubber similarly to that of the pneumatic tire of the third preferred embodiment and the preferable degree of expansion and the preferable range of the average diameter of closed cells are the same as those in the third preferred embodiment. Examples of the foaming agent and the auxiliary foaming agent, the preferable combinations thereof, the examples of the rubber component used as the matrix and the examples of the additives used in the expanded rubber are the same as those in the third embodiment.

In the pneumatic tire of the fifth preferred embodiment, the structure and the materials of members other than the tread can be determined in accordance with conventional practice.

Figure 16A:
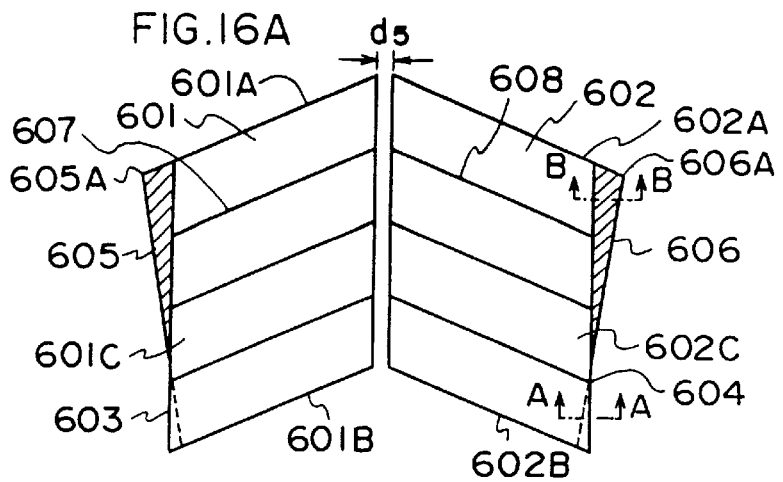
FIG. 16A is an enlarged plan view of a pair of blocks of a tread of a sixth preferred embodiment of a pneumatic tire in accordance with the present invention.

The tread for a sixth preferred embodiment of a pneumatic tire in accordance with the present invention, has pairs of blocks. As shown in FIG. 16A, each pair of blocks has the first block 601 and the second block 602 disposed along the axial direction of the tire. Both tire circumferential direction end portions 601A and 601B of the first block 601 are inclined with respect to the axial direction of the tire at a predetermined angle. Both tire circumferential direction end portions 602A and 602B of the second block 602 are also inclined with respect to the axial direction of the tire at a predetermined angle. The end portions 601A and 601B of the first block 601 and the end portions 602A and 602B of the second block 602 are inclined in opposite directions. What is meant by "end portions are inclined in opposite directions" is the same as what is meant by "sipes are inclined in opposite directions" as shown in the figures, specifically one item is inclined upward from left to right, and the corresponding item is inclined downward from left to right.

Figure 16B:
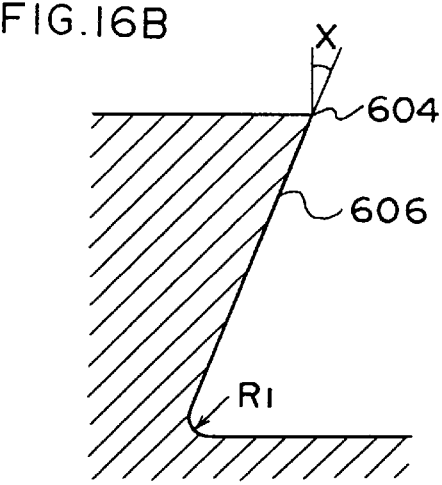
FIG. 16B is a sectional view of a portion of one of the blocks shown in FIG. 16A cut along line A—A in FIG. 16A.
Figure 16C:
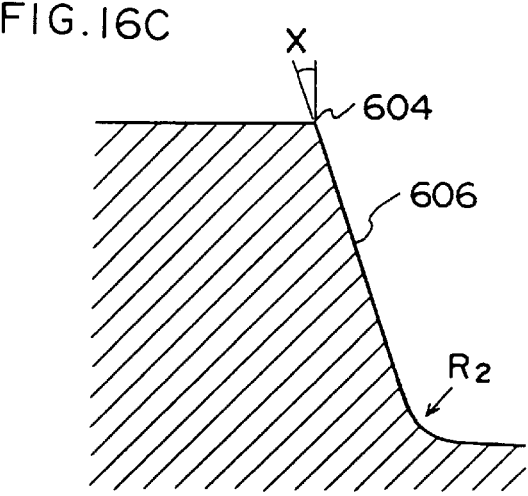
FIG. 16C is a sectional view of a portion of one of the blocks shown in FIG. 16A cut along line B—B in FIG. 16A.

In the first block 601, the edge 603 of the end portion 601C which is farthest from the second block 602 is substantially parallel to the circumferential direction of the tire. In the second block 602, the edge 604 of the end portion 602C which is farthest from the first block is substantially parallel to the circumferential direction of the tire. In the side wall 605 including the edge 603 in the first block 601, the portion 605A which is a lower portion of the side wall 605 at the side of the end portion 601A is disposed further away from the second block 602 than the edge 603 and lower portions are gradually inclined toward the second block 602 along the circumferential direction of the tire from the portion 605A to the portion opposite to the portion 605A. Similarly, in the side wall 606 including the edge 604 in the second block 602, the portion 606A which is a lower portion of the side wall 606 at the side of the end portion 602A is disposed further away from the first block 601 than the edge portion 604 (FIG. 16C) and lower portions of the side wall 606 are gradually inclined toward the first block 601 along the circumferential direction of the tire from the portion 606A to the portion opposite to the portion 606A (FIG. 16B).

The angle X between the side wall 606 of the second block 602 (or the side wall 605 of the first block 601) or the extended line thereof and the radial direction of the tire is preferably +5 to +15° at the portion 602A (or the side portion 601A) and preferably −5 to +2° at the end portion 602B (or the end portion 601B).

In the first block 601, sipes 607 are substantially parallel to the end portion 601A. In the second block 602, sipes 608 are substantially parallel to the end portion 602A. The distance $d_5$ between the first block 601 and the second block 602 is preferably 0.3 to 1 mm.

Figure 25A:
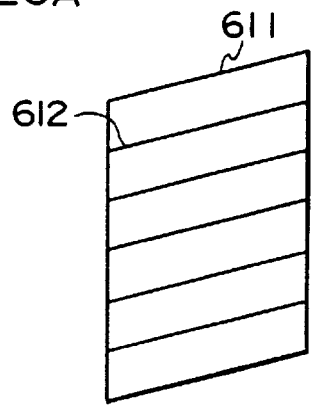
FIG. 25A is a plan view of a block having conventional sipes.
Figure 25B:
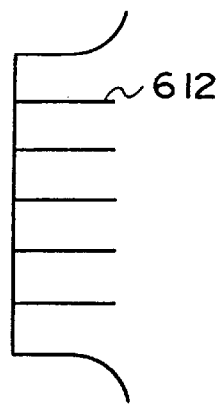
FIG. 25B is a side view of the block of FIG. 25A.
Figure 25C:
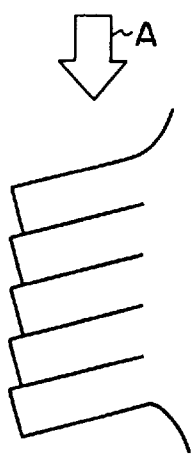
FIG. 25C is a side view of the block of FIG. 25A when a force is applied thereto along the direction of arrow A.

When the side walls extend in the circumferential direction of the tire of a block in which the above sipe (612 in the figures) are disposed do not have the above structure as shown in FIGS. 25A and 25B, the block falls down or collapses by application of force in the direction shown by the arrow A as shown in FIG. 25C.

Figure 17A:
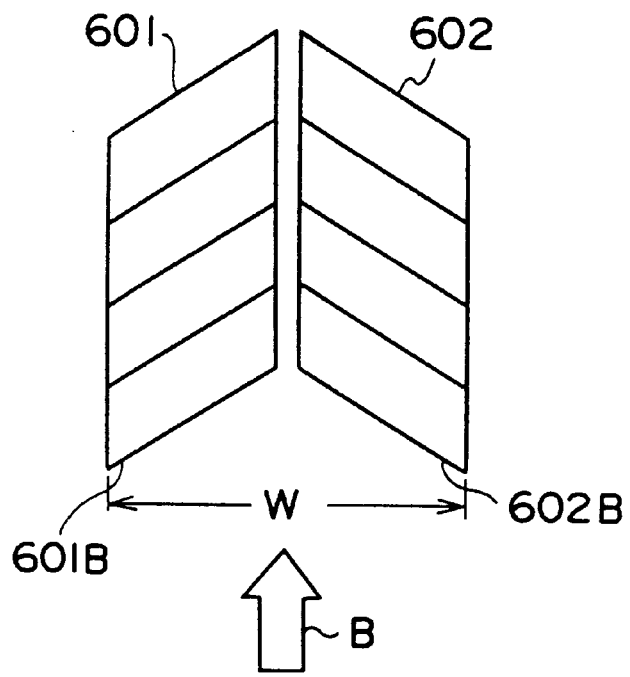
FIG. 17A is a plan view showing force due to traction applied to the blocks of FIG. 16A.
Figure 17B:
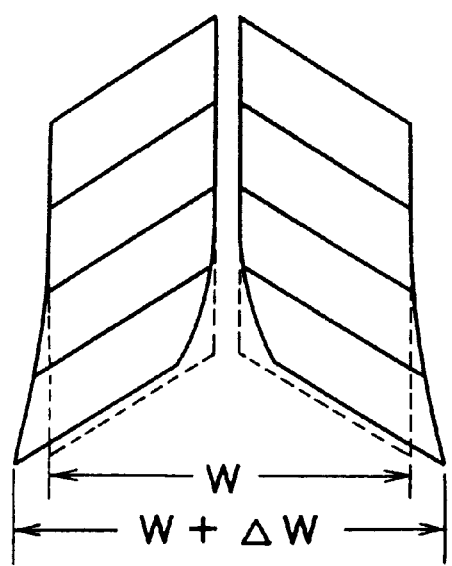
FIG. 17B is a plan view showing deformation of the blocks of FIG. 17A due to applied force.

In contrast, in the pneumatic tire of the six preferred embodiment, when force from the direction shown by the arrow B is applied to the first block 601 and the second block 602 from the side of the side portions 601B and 602B, respectively, as shown in FIG. 17A, portions of the above side walls to which the force is applied are deformed in a manner shown in FIG. 17B. This is because, in each block, the lower portion of the side wall to which the force is applied is located more inwardly than the lower portion of the side wall, which lower portion is opposite to the side where the force is applied. The total width of the pair of blocks in the axial direction of the tire increases by ΔW from the width W in the axial direction of the tire before deformation due to deformation. Based on this phenomenon, the force applied to the tire in traction or breaking is received suitably and properties on ice and on snow are improved.

Figure 18A:
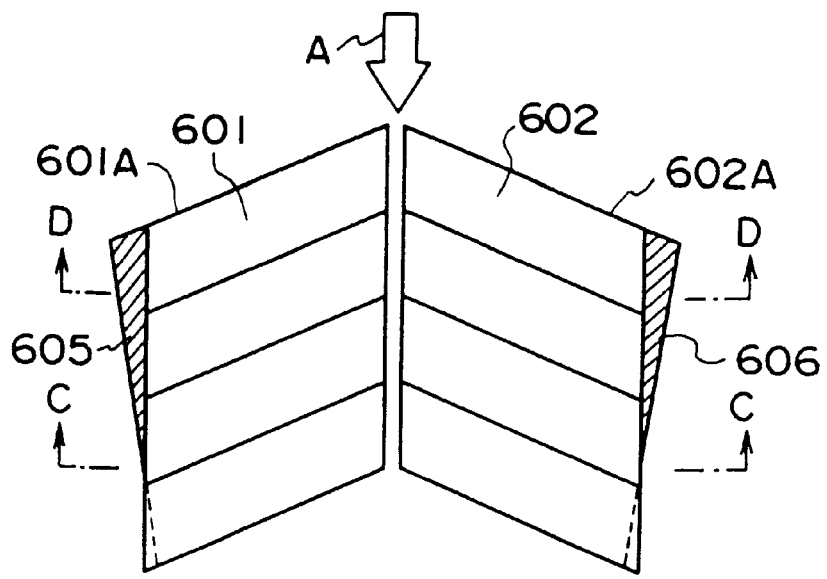
FIG. 18A is a plan view showing force due to braking applied to the blocks of FIG. 16A.
Figure 18B:
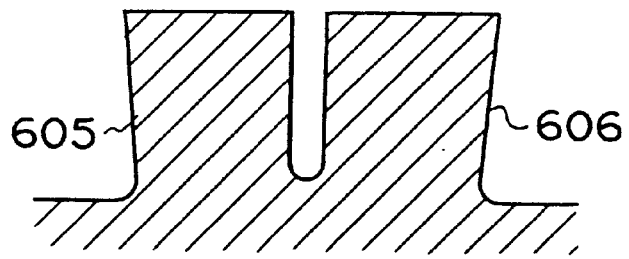
FIG. 18B is a sectional view of the blocks shown in FIG. 18A cut along line C—C in FIG. 18A.
Figure 18C:
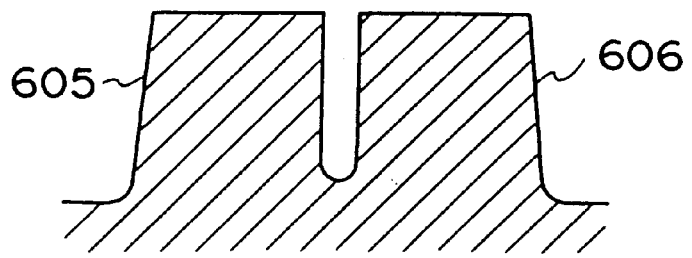
FIG. 18C is a sectional view of the blocks shown in FIG. 18A cut along line D—D in FIG. 18A.

On the other hand, when force from the direction shown by arrow A is applied to the first block 601 and the second block 602 from the side of the side portions 601A and 602A, respectively, as shown in FIG. 18A, portions of the above side walls to which the force is applied are deformed less readily. This is because, in each block, the lower portion of the side wall to which the force is applied is located more outwardly than the lower potion of the side walls, which lower portion is opposite to the side where the force is applied (FIGS. 18B and 18C). Rigidity of the side wall at the side where the force is applied is thus greater than rigidity of the side wall at the opposite side.

Figure 19:
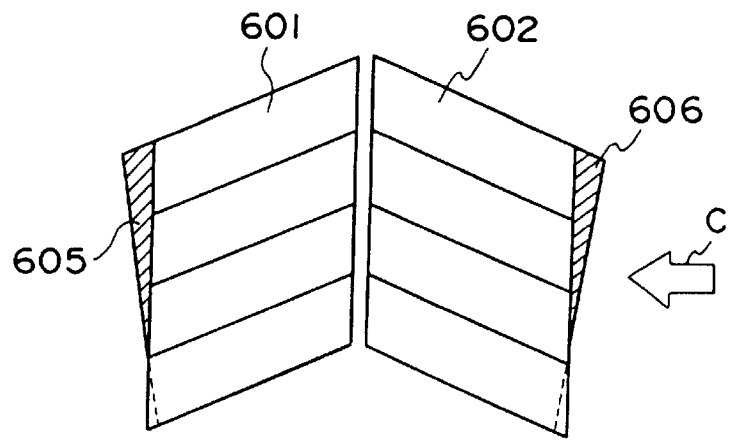
FIG. 19 is a plan view showing the block of FIG. 16A to which force is applied in the transverse direction.
Figure 20:
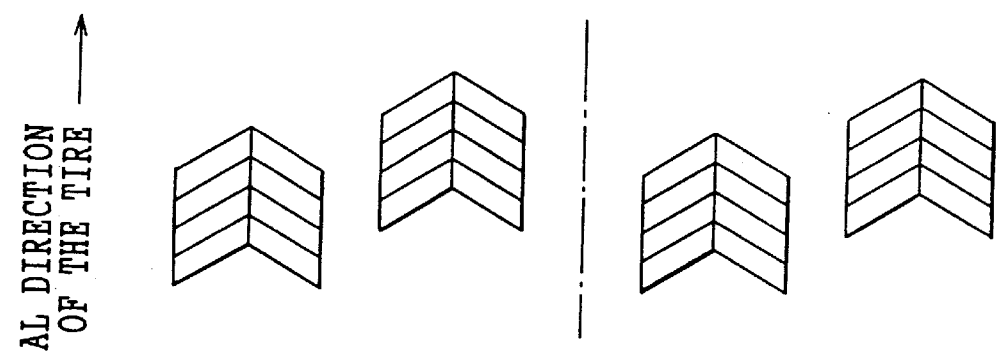
FIGS. 20 through 23 are plan views of block patterns for the sixth preferred embodiment of a pneumatic tire in accordance with the present invention.

As shown in FIG. 19, when force is applied from the axial direction of the tire, blocks forming the pair support each other and deformation of the block is suppressed.

In the sixth preferred embodiment, the distance between the sipes is preferably 2 to 5 mm.

Examples of tread patterns of the pneumatic tire of the sixth preferred embodiment having the above blocks are shown in FIGS. 20 to 23.

When the pneumatic tire of the present embodiment is a studless tire, it is preferable that rubber for the tread is an expanded rubber similar to those of the pneumatic tire of the third preferred embodiment and the preferable degree of expansion and the preferable range of the average diameter of closed cells are the same as those in the third preferred embodiment. Examples of the foaming agent and the auxiliary foaming agent, the preferable combinations thereof, the examples of the rubber component used as the matrix and the examples of the additives used in the expanded rubber are the same as those in the third preferred embodiment.

In the pneumatic tire of the sixth preferred embodiment, the structure and the materials of members other than the tread can be determined in accordance with conventional practice.

EXAMPLES

Example 1 and Comparative Example 1

To confirm the effects of the present invention, a tire in accordance with the present invention was prepared (Example 1) and compared with a conventional tire (Comparative Example 1). The comparison was made with respect to an overall evaluation while driving on snow, the braking property on snow, the traction property on ice, the overall evaluation while driving on ice and the braking property on ice.

Tire of Example 1: A tire having a block pattern described in the first preferred embodiment (tire size: 205/65R15) (refer to FIG. 1).

Figure 3:
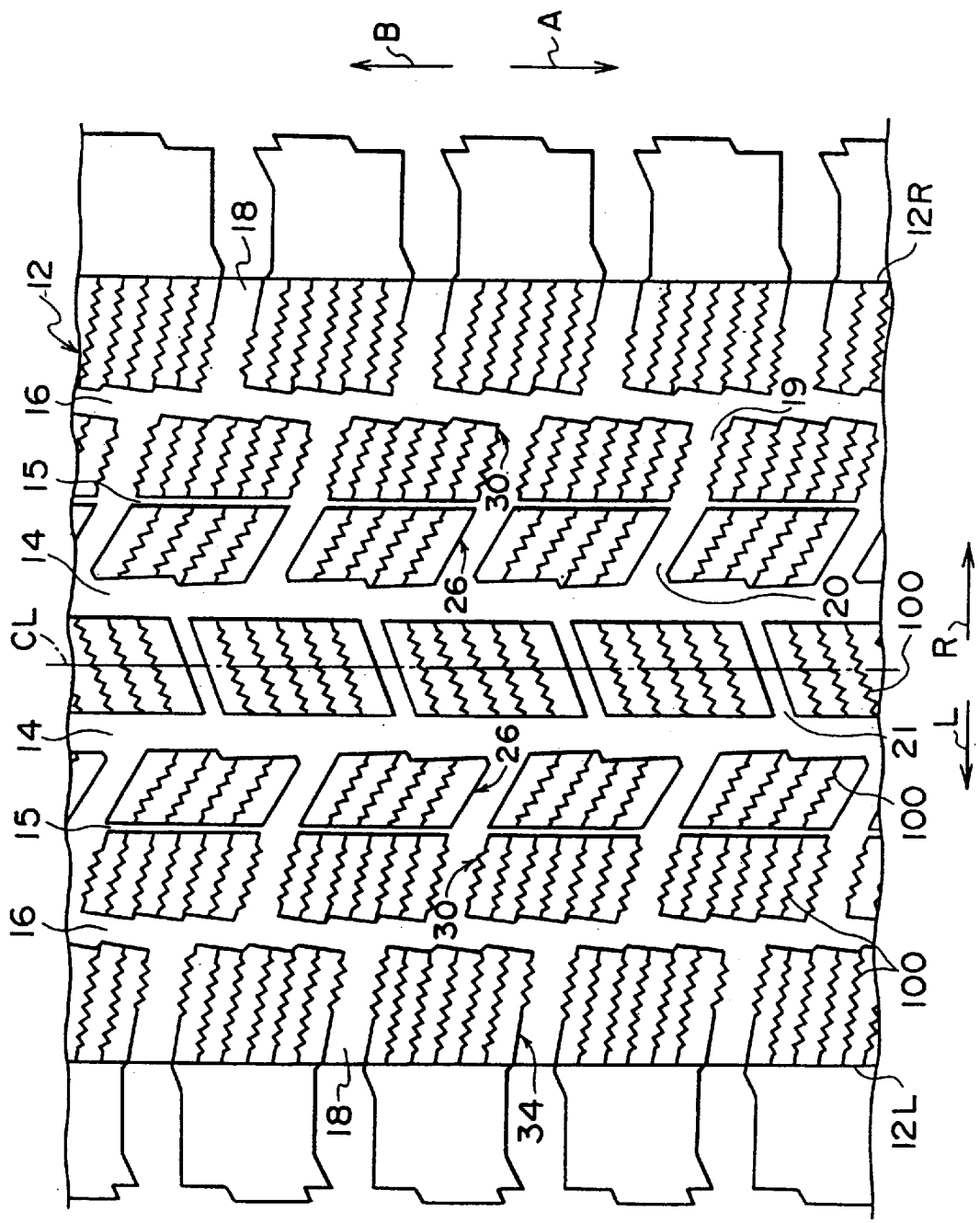
FIG. 3 is a plan view of a tread of a conventional pneumatic tire.

Tire of Comparative Example 1: A tire of the same size having the same block pattern as that of the tire of Example 1 except that, in each block having sipes, sipes 100 were substantially parallel with both tire circumferential direction end portions of the block as shown in FIG. 3.

Overall evaluation while driving on snow: The overall evaluation while driving on snow took into consideration, the braking property, property during the start of driving, straight-line stability, and cornering while driving on a test course road covered with packed snow. The result was expressed as an index using the result of the tire of Comparative Example 1 as the control which was set at 100. The greater the number, the better the overall evaluation on snow.

Braking property on snow: While a vehicle using test tires was driven on a road covered with packed snow at a speed of 40 km/hour, the brake was fully applied. The stopping distance was measured and the inverse of the distance calculated or computed. The result of the evaluation was expressed as an index using the inverse of the stopping distance for the tire of Comparative Example 1 as the control which was set at 100. The greater the number, the better the braking property on snow.

Traction property on ice: A stalled vehicle using test tires was driven on ice. The time required for driving 20 m was measured and the inverse of the time computed. The result of the evaluation was expressed as an index using the inverse of the time obtained for the tire of Comparative Example 1 as the control which was set at 100. The greater the number, the better the traction property on ice.

Overall evaluation while driving on ice: The overall evaluation while driving on ice took into consideration, the braking property, property during the start of driving, straight-line stability, and cornering while driving on a test course road covered with packed ice. The result was expressed as an index using the result for tire of Comparative Example 1 as the control which was set at 100. The greater the number, the better overall evaluation on ice.

Breaking property on ice: While a vehicle using test tires was driven on a road covered with ice at a speed of 20 km/hour, the brake was fully applied. The stopping distance was measured and the inverse of the distance computed. The result of the evaluation was expressed as an index using the inverse of the stopping distance for the tire of Comparative Example 1 as the control which was set at 100. The greater the number, the better the braking property on ice.

The results are shown in Table 1.

TABLE 1

|  | Comparative Example 1 | Example 1 |
| --- | --- | --- |
| Overall evaluation while driving on snow | 100 | 115 |
| Braking property on snow | 100 | 115 |
| Overall evaluation while driving on ice | 100 | 125 |
| Braking property on ice | 100 | 120 |
| Traction property on ice | 100 | 120 |

As shown by the results of the test, the tire of Example 1 prepared in accordance with the present invention exhibited improvements in all categories for the overall evaluation while driving on snow, the braking property on snow, the traction property on ice, the overall evaluation while driving on ice and the braking property on ice in comparison with the tire of Comparative Example 1.

Examples 2 and 3 and Comparative Examples 2 and 3

Figure 26:
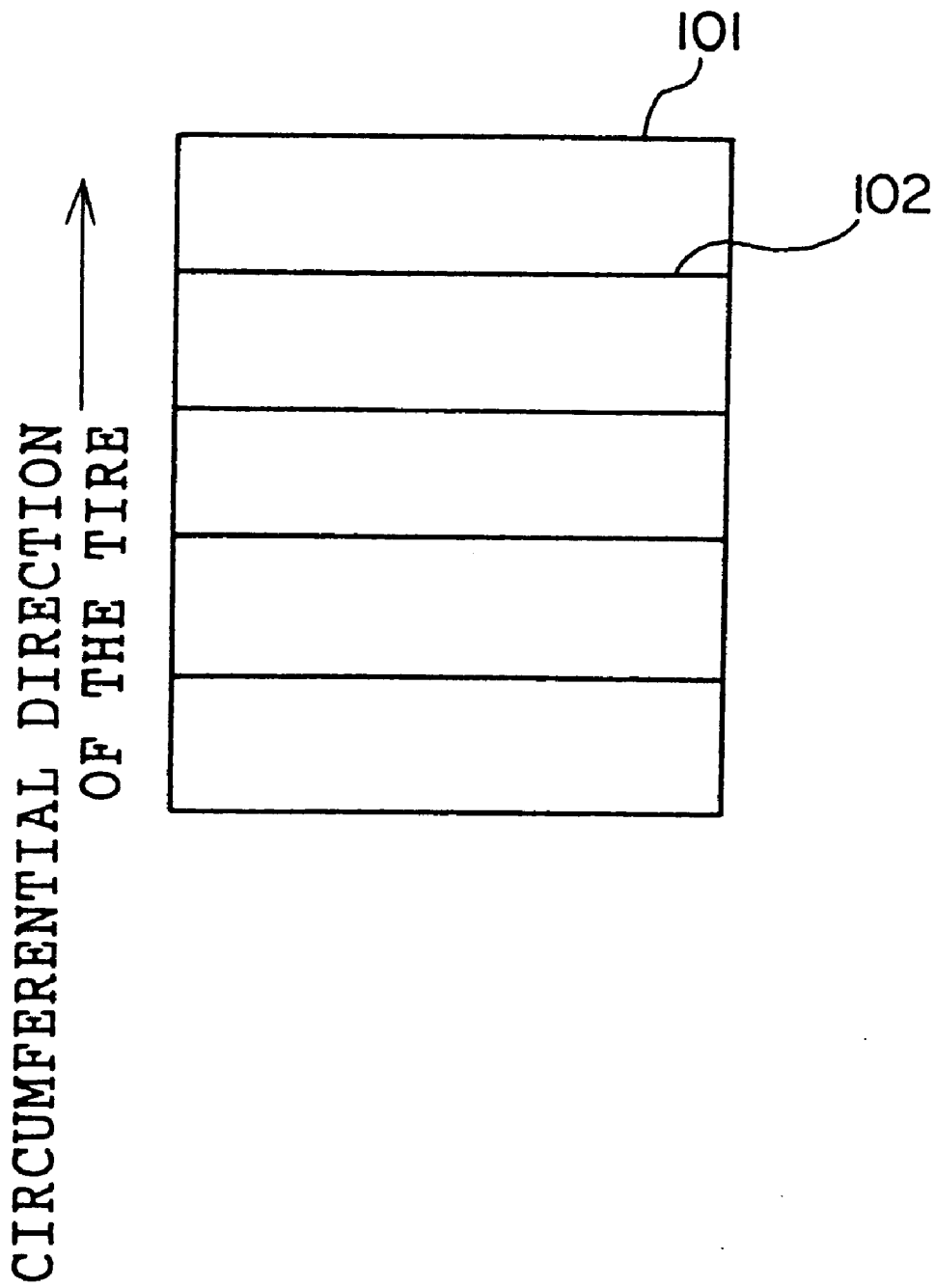
FIG. 26 is a plan view of another block having conventional sipes.

Pneumatic tires having a size of 205/65R15 were prepared in accordance for the conditions shown in Table 2. The prepared tires were attached to rims having a size of 6.5J×15 and inflated to an inner pressure of 210 kPa for the front tires and 230 kPa for the rear tires. The tires mounted on a vehicle, subjected to the road test and evaluated with respect to the properties on snow such as the acceleration and cornering properties, properties on ice, properties on dry road surfaces such as the braking and controllability and properties on wet road surfaces such as the braking and controllability. The tire used in Example 3 had sipes whose shapes are wavy as shown in FIG. 5, and the depth of which both end portions are shallower than central portions thereof. Moreover, the tire used in comparative Example 3 had sipes shown in FIG. 26. The tire used in Comparative Example 2 had sipes which were inclined with respect to the circumferential direction of the tire and which were not parallel to the end portions of the block. The properties were evaluated in accordance with the following methods:

(a) Properties on snow: A vehicle using test tires was driven on ordinary roads covered with snow and the properties were evaluated based on the feel. The result of the evaluation was expressed by a number in a range from 0 to 10, 10 showing the best result.

(b) Properties on ice: While a vehicle using test tires was driven on a road covered with ice (the temperature of the road surface: 0° C.) at a speed of 30 km/hour, the brake was fully applied. The distance before stopping in a locked condition was measured and the inverse of the distance calculated or computed. The result was expressed as an index using the result of the tire of Comparative Example 2 as the control which was set at 100. The greater the number, the better the property on ice.

(c) Properties on dry road surfaces: A vehicle using test tires was driven on a road in dry conditions and the properties on dry road surfaces was evaluated based on the feel. The result of the evaluation was expressed by a number in a range from 0 to 10, 10 showing the best result.

(d) Properties on wet road surfaces: A vehicle using test tires was driven on a road in wet conditions and the properties on wet road surfaces was evaluated based on the feel. The result of the evaluation was expressed by a number in a range from 0 to 10, 10 showing the best result.

The results are shown in Table 2.

TABLE 2

|  | Comparative Example 2 | Comparative Example 3 | Example 2 | Example 3 |
| --- | --- | --- | --- | --- |
| Sipe (Figure 4) |  |  |  |  |
| angle $\alpha_1$ (°) | — | — | 15 to 34 | 20 to 45 |
| distance $d_1$ (mm) | 2.5 | 3.5 | 2.5 | 3 |
| $\theta_1$ (°) | 85 | 90 | 65 to 80 | 60 to 85 |
| $\theta_2$ (°) | 95 | 90 | 65 to 80 | 60 to 85 |
| $\omega_c/\omega_e$ | $\omega_c > \omega_e$ | $\omega_c > \omega_e$ | $\omega_c > \omega_e$ | $\omega_c > \omega_e$ |
| $\delta_c/\delta_e$ | $\delta_c > \delta_e$ | $\delta_c = \delta_e$ | $\delta_c > \delta_e$ | $\delta_c > \delta_e$ |
| Properties on snow |  |  |  |  |
| acceleration | 6 | 5 | 7 | 6.5 |
| cornering | 6 | 5 | 7 | 7.5 |
| Properties on ice (0° C.) | 100 | 90 | 108 | 105 |
| Properties on dry road surfaces | 5 | 5.5 | 6 | 6.5 |
| Properties on wet road surfaces | 5 | 5.5 | 6 | 6.5 |

Examples 4 to 8

Pneumatic tires having a size of 225/50R16 and the tread pattern shown in FIG. 8 were prepared for the conditions shown in Table 3. The prepared tires were attached to rims having a size of 7J and inflated at an inner pressure of 200 kPa. The tires were mounted on a vehicle, subjected to the road test and evaluated with respect to properties on snow such as the acceleration and cornering properties, properties on ice, properties on dry road surfaces such as the braking and controllability and properties on wet road surfaces such as braking and controllability based on the feel. The methods of the evaluation were the same as those described above except that the result was expressed as an index using the result of the tire of Example 4 which was set at 100. The tire of Examples 4 to 8 had the tread having the block pattern shown in FIGS. 29 to 33, respectively. The greater the number, the better the result. The results are shown in Table 3.

TABLE 3

|  | Example 4 | Example 5 | Example 6 | Example 7 | Example 8 |
| --- | --- | --- | --- | --- | --- |
| Sipe |  |  |  |  |  |
| angle $\alpha_2$ (°) | 25 | 25 | 25 | 40 | 25 |
| distance $d_2$ (mm) | 4.5 | 4.5 | 2.5 | 5 | 4.5 |
| bending | No | No | Yes | Yes | No |
| inclination with respect to radial direction of tire | not inclined | not inclined | not inclined | not inclined | inclined |
| Degree of expansion (%) | 26 | 26 | 26 | 26 | 26 |
| Properties on snow |  |  |  |  |  |
| acceleration | 100 | 106 | 107 | 106 | 107 |
| cornering | 100 | 106 | 107 | 108 | 107 |

TABLE 3-continued

|  | Example 4 | Example 5 | Example 6 | Example 7 | Example 8 |
|---|---|---|---|---|---|
| Properties on ice (0° C.) | 100 | 101 | 110 | 98 | 101 |
| Properties on dry road surface | 100 | 103 | 105 | 104 | 104 |
| Properties on wet road surface | 100 | 101 | 103 | 103 | 102 |

Note:
"Bending" means that the sipes bend in the direction of the depth of the tire, as shown in FIG. 28.

Examples 9 to 12

Pneumatic tires having a size of 225/50R16 and the tread patterns shown in FIGS. 10A, 10B and 10C were prepared for the conditions shown in Table 4. The prepared tires were attached to rims having a size of 7J and inflated to an inner pressure of 200 kPa. The tires were attached to a vehicle, subjected to the road test and evaluated with respect to properties on snow such as the acceleration and cornering properties, properties on ice, properties on dry road surfaces such as braking and controllability and properties on wet road surfaces such as the braking and controllability based on the feel. The methods of the evaluation were the same as those described above. The methods of the evaluation were the same as those described above except that the result was expressed as an index using the result of the tire of Example 9 which was set at 100. The tire of Examples 9 to 12 had the tread having the block pattern shown in FIGS. 29 and 34 to 36, respectively. The greater the number, the better the result. The results are shown in Table 4.

TABLE 4

|  | Example 9 | Example 10 | Example 11 | Example 12 |
|---|---|---|---|---|
| Sipe |  |  |  |  |
| angle $\alpha_3$(°) | — | 25 | 25 | 25 |
| distance $d_3$ (mm) | 4.5 | 4.5 | 4.5 | 4.5 |
| bending | No | Yes | No | No |
| inclination with respect to radial direction of tire | not inclined | not inclined | not inclined | inclined |
| Degree of expansion (%) | 26 | 26 | 26 | 26 |
| Properties on snow |  |  |  |  |
| acceleration | 100 | 107 | 102 | 104 |
| cornering | 100 | 107 | 108 | 107 |
| Properties on ice (° C.) | 100 | 110 | 108 | 109 |
| Properties on dry road surface | 100 | 110 | 104 | 107 |
| Properties on wet road surface | 100 | 105 | 103 | 104 |

Example 13 to 17

Pneumatic tires having a size of 225/50R16 and the tread patterns shown in FIGS. 13 to 15 were prepared for the conditions shown in Table 5. The prepared tires were attached to rims having a size of 7J and inflated to an inner pressure of 200 kPa. The tires were mounted on a vehicle, subjected to the road test and evaluated with respect to properties on snow such as acceleration and cornering, properties on ice, properties on dry road surfaces such as braking and controllability and properties on wet road surfaces such as braking and controllability based on the feel. The methods of the evaluation were the same as those described above. The methods of the evaluation were the same as those described above except that the result was expressed as an index using the result of the tire of Example 13 which was set at 100. The tire of Examples 13 to 17 had the tread having the block pattern shown in FIGS. 37 to 41, respectively.

TABLE 5

|  | Example 13 | Example 14 | Example 15 | Example 16 | Example 17 |
|---|---|---|---|---|---|
| Sipe |  |  |  |  |  |
| angle $\alpha_4$(°) | 25 | 25 | 25 | 25 | 25 |
| distance $d_4$ (mm) | 4.5 | 4.5 | 4.5 | 4.5 | 4.5 |
| bending | No | No | Yes | Yes | No |
| inclination with respect to radial direction of tire | not inclined | not inclined | not inclined | not inclined | inclined |
| Angle |  |  |  |  |  |
| γ (°) | 5 | 5 | 5 | 5 | 5 |
| β (°) | 5 | 10 | 10 | 10 | 10 |
| Degree of expansion (%) | 26 | 26 | 26 | 26 | 26 |
| Properties on snow |  |  |  |  |  |
| acceleration | 100 | 107 | 108 | 110 | 108 |
| cornering | 100 | 106 | 108 | 107 | 107 |
| Properties on ice (° C.) | 100 | 108 | 110 | 110 | 110 |
| Properties on dry road surface | 100 | 107 | 108 | 108 | 108 |
| Properties on wet road surface | 100 | 104 | 104 | 108 | 105 |

Example 18 and Comparative Example 4

Figure 21:
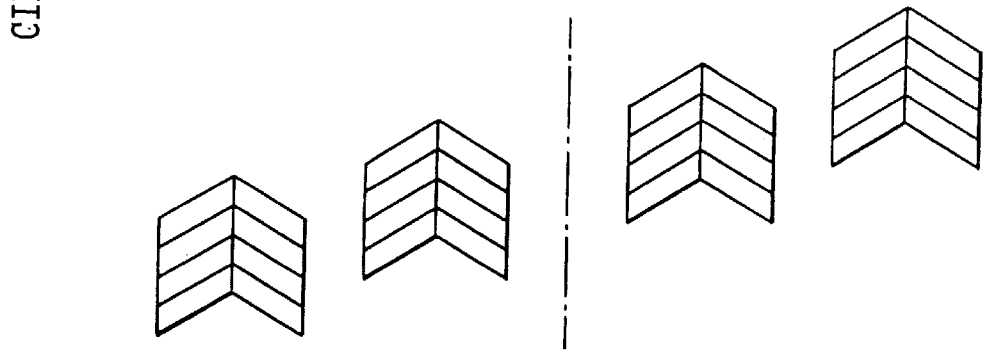
Figure 22:
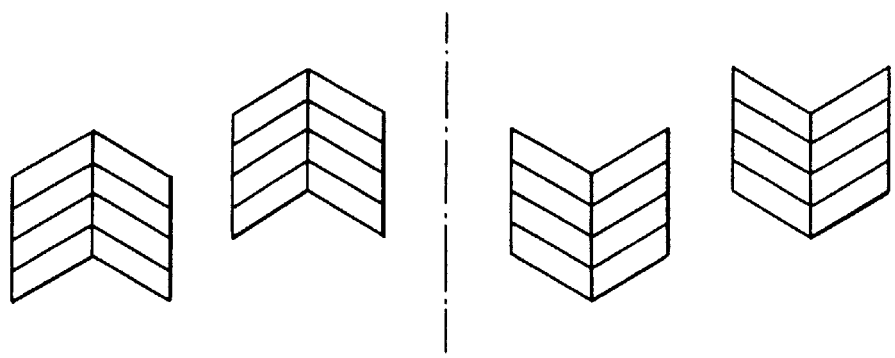
Figure 23:
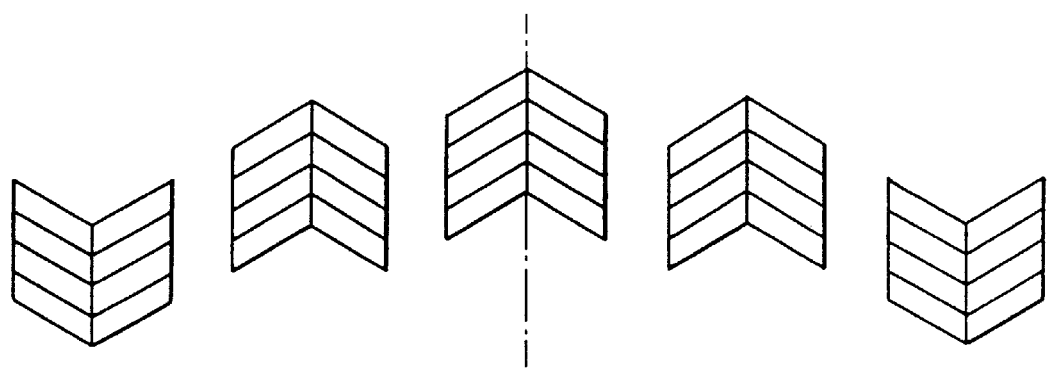
Figure 24:
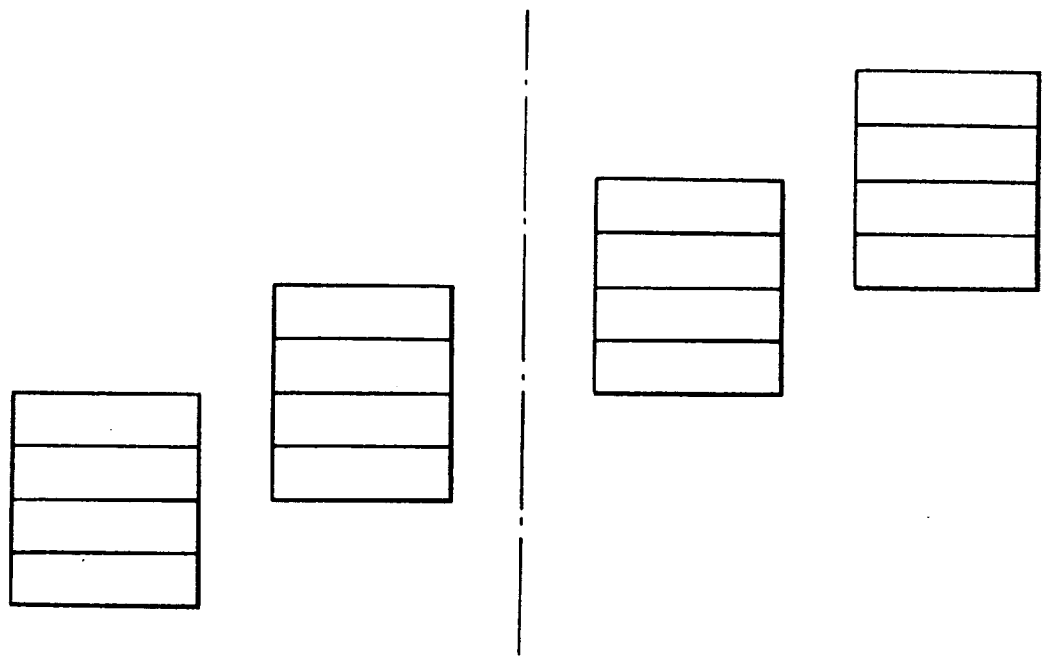
FIG. 24 is a plan view of a block pattern of a Comparative Example.

A pneumatic tire having a size of 225/50R16 and the tread pattern shown in FIG. 21 was prepared for the conditions shown in Table 6. The prepared tire was attached to a rim having a size of 6.5JJ and inflated to an inner pressure of 190 kPa. The tire was mounted on a vehicle, subjected to the road test and evaluated with respect to properties on snow, properties on ice, traction properties on snow, braking properties on snow, properties on dry road surfaces and properties on wet road surfaces based on the feel. The methods of the evaluation of properties on snow, properties on ice, properties on dry road surfaces and properties on wet road surfaces were the same as those of the Example 2. However, properties for acceleration and cornering were evaluated comprehensively for properties on snow. The method of evaluation of braking properties on snow was the same as that in Example 1. Except for travelling over packed snow, the method of evaluation of traction properties on snow was the same as the method of evaluation of traction properties on ice in Example 1. For comparison, a tire which had the same size as the above and the tread having a block pattern shown in FIG. 24 was prepared and evaluated in accordance with the same methods (Comparative Example 4). The tire of Comparative Example 4 was designed so as to have the same negative ratio (the value obtained by dividing the area of grooves by the entire apparent area which can be brought into contact with the road surface) and the same length of projected edge as those of the tire of the Examples. The greater the number of an index, the better the result. The results are shown in Table 6.

TABLE 6

|  | Comparative Example 4 | Example 18 |
| --- | --- | --- |
| $X_1$ (°) | 0 | 5 |
| $X_2$ (°) | 0 | 10 |
| Distance $d_5$ (mm) | 0.4 | 0.4 |
| Distance between sipes (mm) | 3 | 3 |
| Properties on snow | 6 | 7 |
| Properties on ice | 5 | 5.5 |
| Traction properties on snow (index) | 100 | 110 |
| Braking properties on snow (index) | 100 | 103 |
| Properties on dry road surfaces | 5 | 5 |
| Properties on wet road surfaces | 5 | 5 |

Notes:
$X_1$ represents an angle between the radial direction of tire and the side wall 605 (or 606) at the intersection of the side wall 605 (or 606) and the end portion 601B (or 602B) in FIG. 16.
$X_2$ represents an angle between the radial direction of the tire and the side wall 605 (or 606) at the intersection of the side wall 605 (or 606) and the end portion 601A in FIG. 16.

What is claimed is:

1. A pneumatic tire comprising a tread having blocks defined by a plurality of intersecting grooves, wherein
    each of said blocks have pairs of sipes which are formed from a first sipe and a second sipe,
    said first sipes extend from one of two tire axial direction end portions of the block and are inclined with respect to a circumferential direction of the tire,
    said second sipes extend from the other tire axial direction end portion of the block and are inclined with respect to the circumferential direction of the tire,
    said first sipes and said second sipes are alternately disposed along the circumferential direction of the tire,
    an end portion of said first sipes in a vicinity of a center of the block, and an end portion of said second sipes in the vicinity of the center of the block, intersect through an imaginary common line extending along the circumferential direction of the tire,
    said first sipes and said second sipes are inclined in opposite directions,
    said first sipes and said second sipe s do not intersect each other,
    the first sipes on each block are parallel with one another, and
    the second sipes on each block are parallel with one another.

2. A pneumatic tire according to claim 1, wherein the blocks are defined by grooves extending along a circumferential direction of the tire and grooves which intersect the grooves disposed in the circumferential direction of the tire, the first sipes of each block disposed linearly along the circumferential direction of the tire are inclined in the same direction and disposed at a predetermined interval, and the second sipes of each block disposed linearly along the circumferential direction of the tire are inclined in the same direction and disposed at a predetermined interval.

3. A pneumatic tire according to claim 2, wherein the grooves extending along the circumferential direction of the tire include first grooves and second grooves which are narrower than the first grooves, and said second grooves are disposed between the first grooves and have a width of 0.5 to 6 mm.

4. A pneumatic tire according to claim 1, wherein the first and second sipes formed in the blocks which are disposed in the central area of the tread are inclined with respect to the circumferential direction of the tire at an angle of 45 to 85°.

5. A pneumatic tire according to claim 4, wherein an angle between one of first and second sipes and an extended line of the other is 10 to 45°, and wherein said angle sandwiches the circumferential direction.

6. A pneumatic tire according to claim 5, wherein a distance between the first sipes and a distance between the second sipes are each 2 to 5 mm.

7. A pneumatic tire according to claim 5, wherein a central area C and two end areas E are delimited by defining each block as having three equal parts, where
    $\omega_c$ represents a total length, in the circumferential direction of the tire, of respective portions of one first sipe and one second sipe, which portions are located within the central area C,
    $\delta_c$ represents a total length, in the axial direction of the tire, of respective portions of one first sipe and one second sipe, which portions are located within the central area C,
    $\omega_e$ represents the longer of a length, in the circumferential direction of the tire, of a portion of one first sipe, which portion is located in an end area E, and a length, in the circumferential direction of the tire, of a portion of one second sipe, which portion is located in an end area E,
    $\delta_e$ represents the longer of a length, in the axial direction of the tire, of the portion of one first sipe, which portion is located in the end area E, and a length, in the axial direction of the tire, of the portion of one second sipe, which portion is located in the end area E, and
    $\omega_c$, $\omega_e$, $\delta_c$, and $\delta_e$ satisfy relations $\omega_c > \omega_e$ and $\delta_c > \delta_e$.

8. A pneumatic tire according to claim 5, wherein the depths of end portions of one of the first and second sipes are shallower than the depths of central portions.

9. A pneumatic tire according to claim 1, wherein the first and second sipes formed in the blocks which are disposed in the central area of the tread are inclined with respect to the circumferential direction of the tire at an angle of 55 to 80°.

10. A pneumatic tire according to claim 1, wherein a number of the first and second sipes formed on each block is two or more, and at least four sipes of the first sipes and the second sipes are one of curved and bent in the direction of the depth of the block and inclined with respect to a radial direction of the tire.

11. A pneumatic tire according to claim 1, wherein blocks disposed in side areas of the tread have sipes whose angle with respect to the circumferential direction of the tire is greater than an angle between each of the sipes formed in blocks disposed in the central area of the tread and the circumferential direction of the tire.

12. A pneumatic tire according to claim 1, wherein a distance between end portion of the first sipe, which end portion is in the vicinity of the center of the block, and end portion of the second sipe, which end portion is in the vicinity of the center of the block, in an axial direction of the tire is 2 to 15 mm.

13. A pneumatic tire according to claim 1, wherein a distance between end portion of the first sipe, which end portion is in the vicinity of the center of the block, and end portion of the second sipe, which end portion is in the vicinity of the center of the block, in axial direction of the tire is 3 to 10 mm.

14. A pneumatic tire according to claim 1, wherein, when an area of the tread having 30 to 70% of an entire width of an area contacting road surfaces at the center of the tread is referred to as a central area and remaining areas are referred to as side areas, a chevron formed by one of the first and second sipes forming a pair and an extended line of the other sipe of the pair in blocks in the central area and a chevron formed by one of the first and second sipes forming a pair and an extended line of the other sipe of the pair in blocks in the side areas are placed in directions opposite to each other with respect to the circumferential direction of the tire.

15. A pneumatic tire according to claim 1, wherein the blocks have pairs of sipes which are formed from first sipe and second sipe, and when each block is equally divided in first and second portions by a line extending along the tire axial direction, apices of chevrons each formed by one of the first sipe and the second sipe forming a pair in the first portion and an extended line of the other sipe of the pair face apices of chevrons each formed by one of the first sipe and the second sipe forming a pair in the second portion and an extended line of the other sipe of the pair.

16. A pneumatic tire according to claim 1, wherein in each block, an angle between the radial direction of the tire and a first wall of the block at a side of an apex of a chevron formed by one of the first and second sipes forming a pair and an extended line of the other sipe of the pair is greater than an angle between the radial direction of the tire and a second side wall of the block at a side opposite to said first side wall.

17. A pneumatic tire according to claim 1, wherein central portions of the first and second sipes are formed in one of a zigzag and a wavy configuration, and end portions extend substantially straight.

18. A pneumatic tire according to claim 1, wherein the first and second sipes are one of curved and bent in the direction of the depth of the block and inclined with respect to a radial direction of the tire.

19. A pneumatic tire according to claim 1, wherein rubber used in the tread is an expanded rubber.

20. A pneumatic tire according to claim 19, wherein a degree of expansion of the expanded rubber is 10 to 50%.

* * * * *